(12) United States Patent
Aragon

(10) Patent No.: US 8,885,881 B2
(45) Date of Patent: Nov. 11, 2014

(54) SCENE DETERMINATION AND PREDICTION

(75) Inventor: Juan Carlos Aragon, Sunnyvale, CA (US)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 334 days.

(21) Appl. No.: 13/371,723

(22) Filed: Feb. 13, 2012
(Under 37 CFR 1.47)

(65) Prior Publication Data

US 2012/0243740 A1 Sep. 27, 2012

Related U.S. Application Data

(60) Provisional application No. 61/467,218, filed on Mar. 24, 2011.

(51) Int. Cl.
*G06K 9/00* (2006.01)
(52) U.S. Cl.
CPC ........ *G06K 9/00684* (2013.01); *G06K 9/00718* (2013.01)
USPC .......................................... 382/103; 382/181

(58) Field of Classification Search
None
See application file for complete search history.

(56) References Cited

U.S. PATENT DOCUMENTS

| | | | |
|---|---|---|---|
| 6,307,550 B1 * | 10/2001 | Chen et al. | 345/418 |
| 2008/0279456 A1 * | 11/2008 | Kasahara et al. | 382/190 |
| 2009/0087096 A1 * | 4/2009 | Eaton et al. | 382/190 |
| 2009/0136125 A1 * | 5/2009 | Fujita | 382/165 |

* cited by examiner

*Primary Examiner* — Jon Chang
(74) *Attorney, Agent, or Firm* — Patent Law Works LLP

(57) ABSTRACT

A system and method for scene determination is disclosed. The system comprises a communication interface, an object detector, a temporal pattern module and a scene determination module. The communication interface receives a video including at least one frame. The at least one frame includes information describing a scene. The object detector detects a presence of an object in the at least one frame and generates at least one detection result based at least in part on the detection. The temporal pattern module generates a temporal pattern associated with the object based at least in part on the at least one detection result. The scene determination module determines a type of the scene based at least in part on the temporal pattern.

20 Claims, 20 Drawing Sheets

SCENE DETERMINATION AND PREDICTION

BACKGROUND

The specification relates to image processing systems. In particular, the specification relates to a system and method for scene determination and prediction associated with a video including one or more frames.

A system for determining a scene surrounding a road is beneficial in many ways. For example, the system may alert a driver to be cautious for animals crossing the road if the system determines that the driver is driving in a forest scene. However, categorizing a scene from one or more images captured in the scene is affected by a variety of factors such as presence of trees and buildings, traffic information on the road, etc. Even scenes in the same category may have a number of variations. For example, a first forest scene may only include trees crowded along the road; a second forest scene may have sporadic cabin distributed among the trees; and a third forest scene may be absent of trees within a short distance from the road. It is very easy to misclassify a scene captured by the images because of the variations in the scene.

Existing solutions for scene determination have numerous problems. First, the existing solutions only perform spatial analysis to individual images captured in the scene. For example, the existing solutions extract features for spatially distributed objects (e.g., trees) in individual images and determine the scene based on the spatially distributed objects. However, different scenes may include the same objects and it is very easy to misclassify the scenes only based on the spatial information in the individual images. For example, both a forest scene and a suburban scene have a presence of trees and it is difficult to distinguish a forest scene from a suburban scene only based on the detection of trees in individual images.

Second, the existing solutions ignore distribution characteristics of the objects across a plurality of images, which is referred to as time-domain information because the images are captured in different time instances while the driver is driving an automobile. The lack of the time-domain information in existing solutions may reduce the accuracy of the scene determination. For example, if there is an instantaneous variation such as an absence of trees within a short distance in a forest scene, the existing solutions fail to determine that the scene is a forest scene because of the absence of tress within the short distance, even though the distribution characteristics of tree presence across the images still indicate that it is a forest scene.

Third, the existing solutions fail to perform scene prediction for the scene. For example, the existing solutions fail to predict whether the driver will be driving in the same scene or in a different scene in the next 5 minutes.

SUMMARY OF THE INVENTION

The specification overcomes the deficiencies and limitations of the prior art at least in part by providing a system and method for scene determination and prediction. The system comprises a communication interface, an object detector, a temporal pattern module and a scene determination module. The communication interface receives a video including at least one frame. The at least one frame includes information describing a scene. The object detector detects a presence of an object in the at least one frame and generates at least one detection result based at least in part on the detection. The temporal pattern module generates a temporal pattern associated with the object based at least in part on the at least one detection result. The scene determination module determines a type of the scene based at least in part on the temporal pattern.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
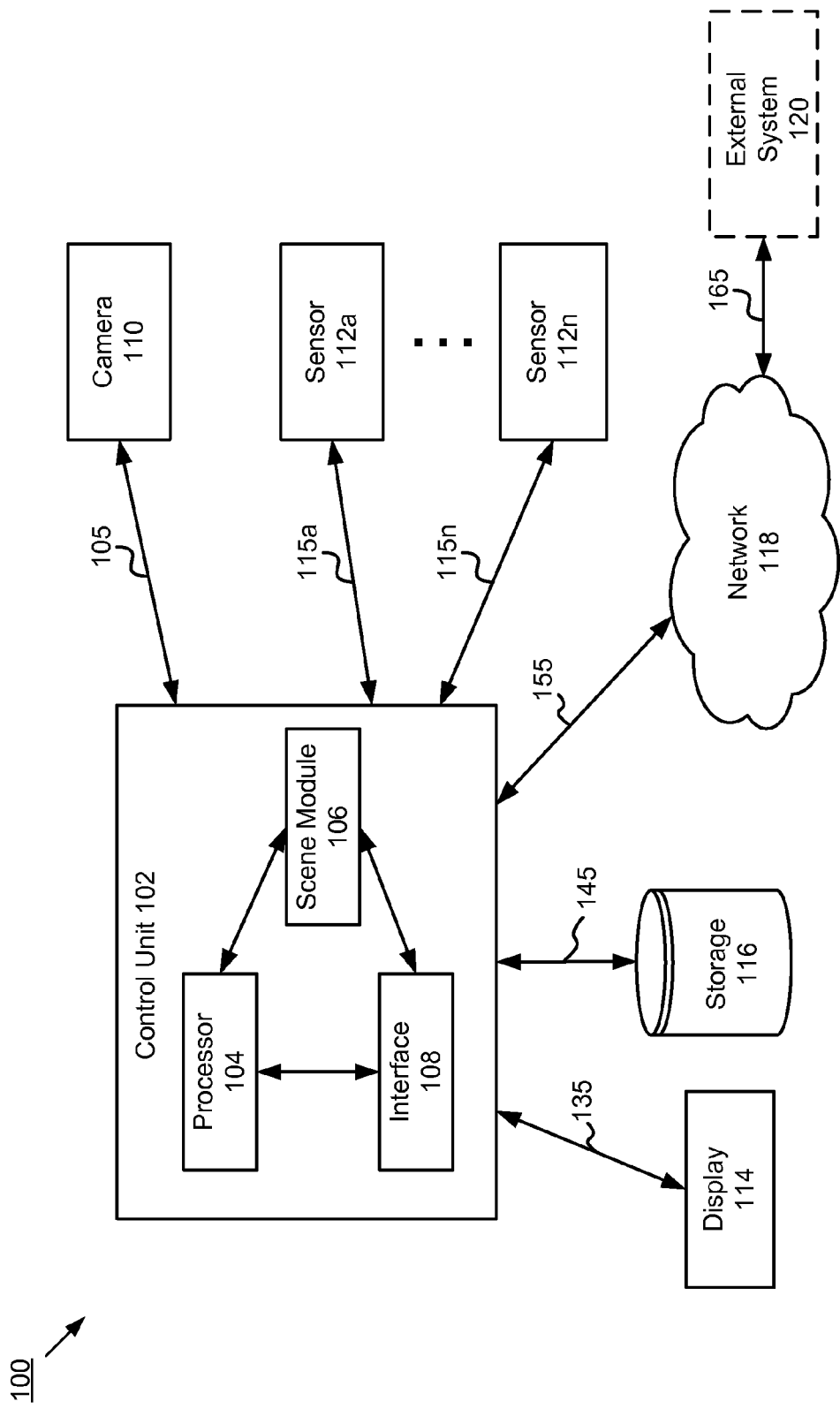
FIG. 1 is a high-level block diagram illustrating a system for scene determination and prediction according to one embodiment.

A system and method for scene determination and prediction is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 is a high-level block diagram illustrating a system 100 for scene determination and prediction according to one embodiment. The illustrated embodiment of the system 100 includes a control unit 102, a camera 110, sensors 112a . . . 112n, a display 114 and a storage device 116. Optionally, the system 100 also includes an external system 120. The control unit 102 is communicatively coupled to the external system 120 via a network 118. One skilled in the art will recognize that the system 100 may include other components such as an input device for a user to input information to the system 100, a speaker for delivering voice messages to a user, etc.

The camera 110 is communicatively coupled to the control unit 102 via signal line 105. The sensor 112a is communicatively coupled to the control unit 102 via signal line 115a. The sensor 112n is communicatively coupled to the control unit 102 via signal line 115n. The display 114 is communicatively coupled to the control unit 102 via signal line 135. The storage device 116 is communicatively coupled to the control unit 102 via signal line 145. The control unit 102 is communicatively coupled to the network 118 via a communication link 155. In one embodiment, the communication link 155 is a wireless connection. For example, the communication link 155 is a bidirectional wireless connection. The external system 120 is communicatively coupled to the network 118 via a communication link 165. In one embodiment, the communication link 165 is a wireless connection. In another embodiment, the communication link 165 is a wired connection via a cable, a landline, etc.

The sensors 112a ... 112n in FIG. 1 are used by way of example. While FIG. 1 illustrates two sensors, the description applies to any system architecture having one or more sensors. Furthermore, while only one network 118 is coupled to the control unit 102 and the external system 120, in practice any number of networks 118 can be connected to the entities. While only one control unit 102, one camera 110, one display 114 and one storage device 116 are illustrated in FIG. 1, in practice any number of control units 102, cameras 110, displays 114 and storage devices 116 can be included in the system.

The control unit 102 is any processor-based computing device. For example, the control unit 102 is an electronic control unit (ECU) embedded in an automobile. In one embodiment, the control unit 102 is implemented using a single integrated circuit chip. For example, the control unit 102 is a system-on-chip (SOC). In one embodiment, the control unit 102 is configured to receive signals from the sensors 112 and generate control signals to control one or more actuators (not pictured). An actuator is a device for moving or controlling force in an automobile. For example, an actuator is one of a fuel injector, spark plug, throttle regulator and/or one or more electronically-controlled valves in an automobile that are controlled by the control unit 102. In another embodiment, the control unit 102 includes code and routines for providing the functionality described below such as determining a type of a scene, predicting a future scene and determining a type of weather, etc. The control unit 102 includes a processor 104, a scene module 106 and an interface 108. These components of the control unit 102 are communicatively coupled to each other.

The processor 104 comprises an arithmetic logic unit, a microprocessor, a general purpose controller or some other processor array to perform computations, retrieve data stored on a memory (e.g., the storage 116), etc. The processor 104 processes data signals and may comprise various computing architectures including a complex instruction set computer (CISC) architecture, a reduced instruction set computer (RISC) architecture, or an architecture implementing a combination of instruction sets. Although only a single processor is shown in the control unit 102, multiple processors may be included. The processing capability may be limited to supporting the display of images and the capture and transmission of images. The processing capability might be enough to perform more complex tasks, including various types of feature extraction and sampling. It will be obvious to one skilled in the art that other processors and physical configurations are possible.

The scene module 106 is code and routines for processing a video that includes one or more frames capturing information in a scene. A scene is an environment surrounding a road. For example, a scene is one of a forest scene, a suburban scene, an urban scene and a freeway scene, etc. In one embodiment, the video is captured by a camera 110 mounted in the front of an automobile when a driver is driving the automobile on the road. The camera 110 is described below in more detail. The scene module 106 receives the video from the camera 110 via the interface 108 and extracts one or more frames from the video. For example, the scene module 106 extracts a plurality of successive frames captured at successive time instances by the camera 110. The interface 108 is described below in more detail.

In one embodiment, the scene module 106 is implemented in hardware (e.g., in a field-programmable gate array (FPGA) or an application-specific integrated circuit (ASIC), etc.). In another embodiment, the scene module 106 includes software routines and instructions that are stored in a memory (e.g., an on-chip storage) of the control unit 102. In other embodiments, the scene module 106 is implemented as a combination of hardware and software.

The scene module 106 performs a spatial analysis on each of the one or more frames by detecting presence of one or more objects (e.g., trees, houses, walls, etc.) in each of the one or more frames. The scene module 106 also performs a temporal analysis for the one or more frames by generating a temporal pattern for each of the one or more objects based at least in part on results from the spatial analysis. A temporal pattern for an object is a pattern describing distribution of the object across the one or more frames. For example, a temporal pattern includes information describing distribution of the object in a plurality of frames captured by the camera 110 at successive time instances. The temporal pattern is described below in more detail with reference to FIGS. 2A and 2B.

In one embodiment, the scene module 106 determines a type of the scene based at least in part on the spatial analysis and temporal analysis of the one or more frames. For example, the scene module 106 determines whether a driver is driving in a forest scene or a suburban scene based at least in part on the temporal patterns generated by the spatial analysis and temporal analysis of the one or more frames. The distribution information of an object included in a temporal pattern is used by the scene module 106 to distinguish a type of scene from another type of scene because different scenes have different distribution information for the object.

In another embodiment, the scene module 106 predicts a future scene based at least in part on the spatial analysis and temporal analysis of the one or more frames. A future scene is a scene in which a driver will be driving in the future. For example, the scene module 106 predicts that the driver will be driving in a suburban scene in the next 2 minutes based at least in part on the temporal patterns that include distribution information indicating that the future scene is a suburban scene. The scene module 106 is described below in more detail with reference to FIGS. 2A and 2B.

It is particularly advantageous to perform both the spatial analysis and temporal analysis on the frames included in the video because, among other things, it improves accuracy for scene determination and allows the performance of scene prediction for the scene. As described below in more detail with reference to FIGS. 2A-12B, the scene module 106 provides a general framework for scene determination and prediction, adaptable to incorporate a variety of additional information (e.g., road information, sensor data, etc.) into the framework to facilitate scene determination and prediction.

The interface 108 is an interface handling communication between components of the control unit 102 and other entities of the system 100. For example, the interface 108 is an I/O interface that sends signal and/or data to one or more of the camera 110, the sensors 112, the display 114 and the storage 116 and receives signal and/or data from one or more of the camera 110, the sensors 112, the display 114 and the storage 116. In one embodiment, the interface 108 is implemented using an electronic circuit.

In one embodiment, the interface 108 includes a network adapter that couples the control unit 102 to the network 118. For example, the interface 108 includes a network controller that connects the control unit 102 to the network 118 via the communication link 155.

The camera 110 is a device that records images. For example, the camera 110 is a video camera that captures videos. An image in a video is also referred to as a frame of the video. In one embodiment, the camera 110 is mounted in the front of an automobile. In other embodiments, the camera 110 is mounted in other locations on the automobile. In one embodiment, the camera 110 is configured to capture a video including successive frames that describe a scene surrounding a road while a driver is driving an automobile on the road. The camera 110 sends the video to the scene module 106.

The sensor 112a . . . 112n is a device that measures a physical quantity and converts the physical quantity into a signal. Examples of a physical quantity measured by a sensor 112 include, but are not limited to, temperature, stress, pressure, force, light, sound, etc. For example, the sensor 112a . . . 112n is one of a pressure-sensitive sensor, a temperature-sensitive sensor, a sound-sensitive sensor, a force-sensitive sensor and a light-sensitive sensor, etc. One skilled in the art will recognize that other types of sensors are possible. In one embodiment, the system 100 comprises a combination of different types of sensors 112a . . . 112n. For example, the system 100 comprises, among other things, a temperature-sensitive sensor (e.g., a thermometer) that records temperature in the scene, a force-sensitive sensor that detects motion of a wiper (e.g., a wiper detector) and other types of sensors. The sensor 112a . . . 112n sends the signal to the scene module 106 via signal line 105.

The display 114 is a conventional type such as a liquid crystal display (LCD) or any other similarly equipped display device, screen or monitor. The display 114 represents any device equipped to display electronic images and data as described herein. In one embodiment, the display 114 also includes a touch screen so that a user inputs data to the control unit 102 via the touch screen.

The storage 116 is non-transitory memory that stores any data such as sensor data, road information and videos captured by the camera 110, etc. The sensor data is data extracted from signals generated by sensors 112. The sensor data is described below with reference to a sensor module 214 shown in FIG. 2A. The road information is described below with reference to a road condition module 216 shown in FIG. 2A. The storage 116 is a dynamic random access memory (DRAM) device, a static random access memory (SRAM) device, flash memory or some other memory device known in the art. In one embodiment, the storage 116 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In one embodiment, the storage 116 stores data describing algorithms for establishing one or more of an object detection network, a sky detection network, a scene determination network, a scene prediction model and a weather detection network. The storage 116 also includes training data for training one or more of the object detection network, the sky detection network, the scene determination network, the scene prediction model and the weather detection network. These networks and/or models are described below in more detail with reference to FIGS. 2A and 2B. One skilled in the art will recognize that the storage 116 may store other information and/or data for providing the functionality described herein.

The network 118 is a conventional type of network, wired or wireless, and may have any number of configurations such as a star configuration, token ring configuration or other configurations known to those skilled in the art. In one embodiment, the network 118 comprises one or more of a local area network (LAN), a wide area network (WAN) (e.g., the Internet), and/or any other interconnected data path across which multiple devices communicate. In another embodiment, the network 118 is a peer-to-peer network. The network 118 is coupled to or includes portions of a telecommunications network for sending data in a variety of different communication protocols. For example, the network is a 3G network or a 4G network. In yet another embodiment, the network 118 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 118 are encrypted using conventional encryption technologies such as secure sockets layer (SSL), secure HTTP and/or virtual private networks (VPNs).

The external system 120 is a system that communicates with the control unit 102 via a network 118. The external system 120 receives information such as a type of a scene, a type of a future scene and a type of weather from the scene module 106. In one embodiment, the external system 120 includes a database storing information received from control units 102 embedded in a plurality of automobiles. In another embodiment, the external system 120 sends information to control units 102 embedded in a plurality of automobiles. For example, the external system 120 sends updated training data to the control units 102 and the control units 102 update the training data stored in the storage 116 based at least in part on the updated training data.

Scene Module

Figure 2A:
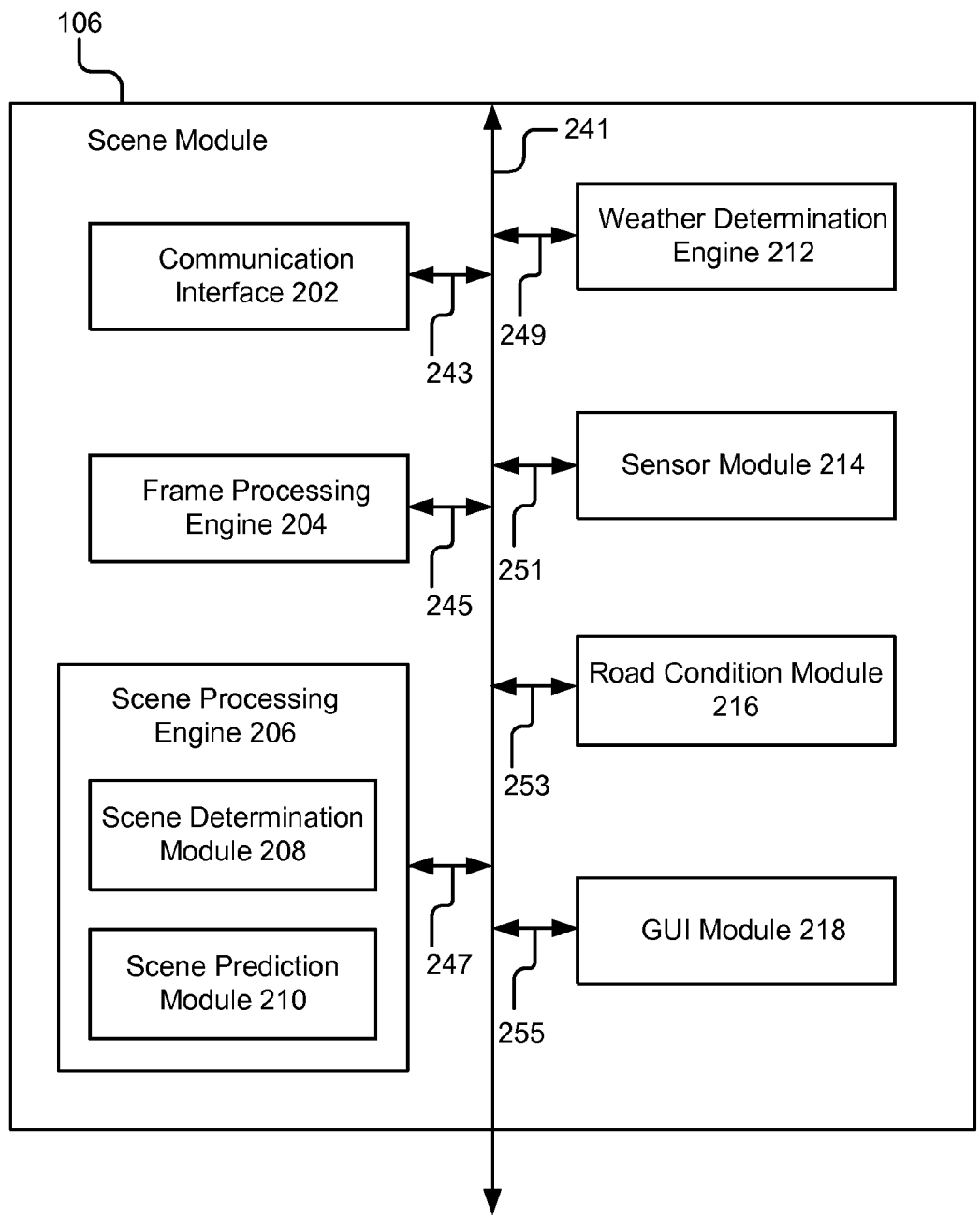
FIG. 2A is a block diagram illustrating a scene module according to one embodiment.
Figure 2B:
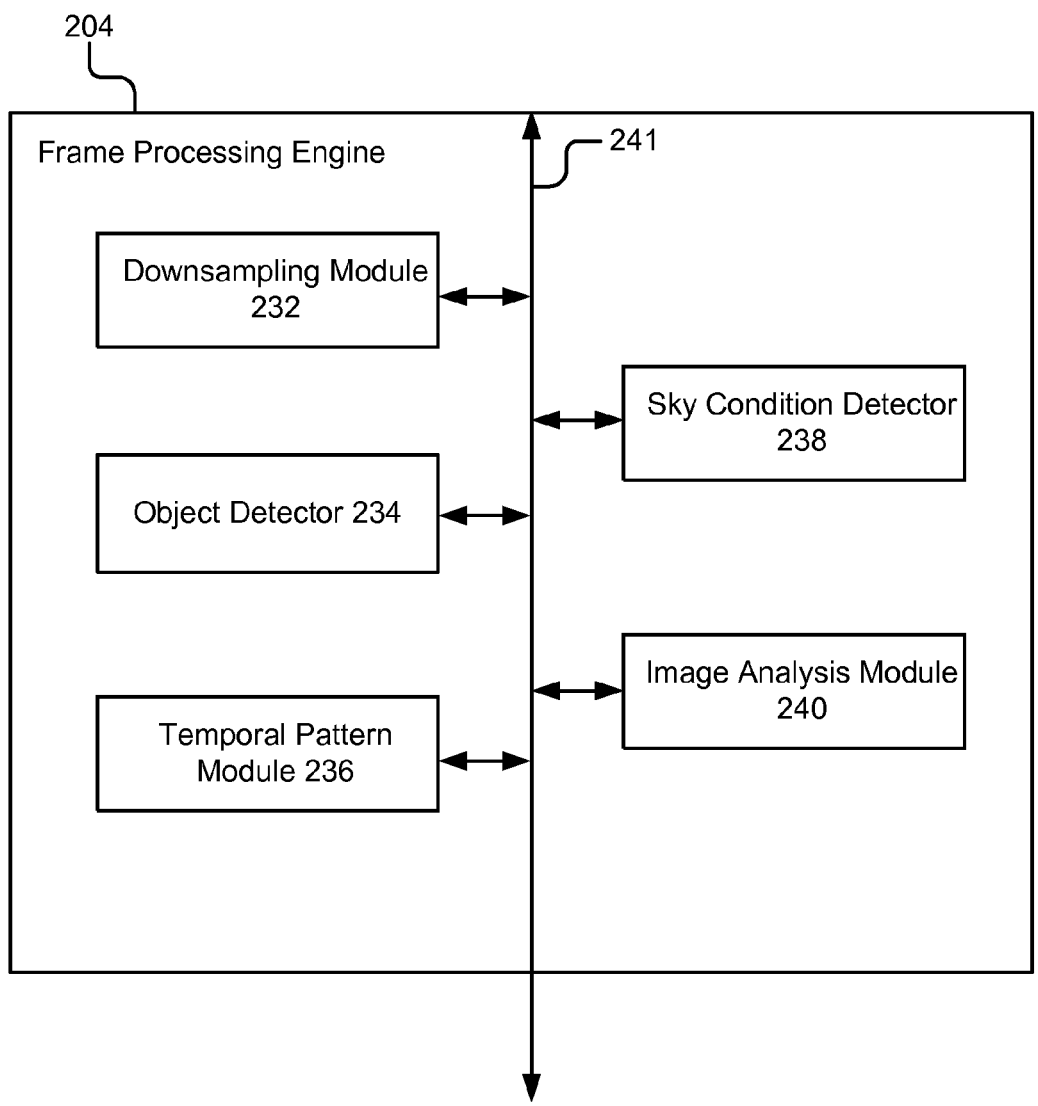
FIG. 2B is a block diagram illustrating a frame processing engine according to one embodiment.

Referring now to FIGS. 2A and 2B, the scene module 106 is shown in more detail. FIG. 2A is a block diagram illustrating the scene module 106 according to one embodiment. The scene module 106 comprises a communication interface 202, a frame processing engine 204, a scene processing engine 206, a weather determination engine 212, a sensor module 214, a road condition module 216 and a graphical user interface (GUI) module 218. These components of the scene module 106 are communicatively coupled to a bus 241 for communication with each other.

The communication interface 202 is code and routines for handling communication between components of the scene module 106 and other components of the system 100. For example, the communication interface 202 receives signals from the sensors 112a . . . 112n via the interface 108 and sends the signals to the sensor module 214. The communication interface 202 is communicatively coupled to the bus 241 via signal line 243.

In one embodiment, the communication interface 202 receives a video from the camera 110 via the interface 108 and sends the video to the frame processing engine 204. In another embodiment, the communication interface 202 receives graphical data from the GUI module 218 and sends the graphical data to the display 114 via the interface 108. In yet another embodiment, the communication interface 202 receives information and/or data (e.g., sensor data, etc.) from other components of the scene module 106 and stores the information and/or data in the storage 106 via the interface 108. In yet another embodiment, the communication interface 202 retrieves information and/or data (e.g., training data, etc.) from the storage 116 via the interface 108 and sends the information and/or data to other components of the scene module 106.

The frame processing engine 204 is code and routines for processing one or more frames included in a video. For example, the frame processing engine 204 receives a video from the camera 110 via the communication interface 202 and extracts one or more successive frames from the video. The frame processing engine 204 performs spatial analysis to the one or more frames by detecting presence of one or more objects in the one or more frames as described below. The frame processing engine 204 also performs temporal analysis to the one or more frames by generating a temporal pattern for each of the one or more objects as described below. The frame processing engine 204 is communicatively coupled to the bus 241 via signal line 245.

For each object, the frame processing engine 204 applies image processing techniques to detect presence of the object in each of the one or more frames. For example, the frame processing engine 204 determines whether an object such as a tree, a house, a wall, etc., is present in a frame by applying pattern recognition techniques to the frame. The frame processing engine 204 generates a detection result for each of the one or more frames so that one or more detection results associated with the object are generated for the one or more frames. A detection result is a result indicating whether an object is detected in a frame. A detection result has either a "true" state or a "false" state. A detection result with a "true" state has a value of "1" indicating that an object is detected in a frame (e.g., the object present in the frame). Alternatively, a detection result with a "false" state has a value of "0" indicating that the object is not detected in the frame (e.g., the object is absent in the frame).

The frame processing engine 204 forms a temporal pattern for the object based at least in part on the one or more detection results. A temporal pattern for an object includes one or more bins describing distribution of object presence across one or more frames. For example, a temporal pattern for tree presence includes a first bin with a value of "1" indicating that tree presence is detected in a first frame and a second bin with a value of "2" indicating that tree presence is detected in both a first frame and a second frame. One skilled in the art will recognize that the temporal pattern may include any number of bins. The generation of the temporal pattern is described below in more detail with reference to FIG. 2B and FIG. 5. In one embodiment, the frame processing engine 204 sends the temporal pattern for the object to the scene processing engine 206. In another embodiment, the frame processing engine 204 stores the temporal pattern for the object in the storage 116.

In one embodiment, the frame processing engine 204 processes a frame and determines a sky condition for the scene captured in the frame. A sky condition is a condition for the sky such as a sunny sky, a rainy sky, a cloudy sky or a blocked sky. A blocked sky is generated when the sky captured by the frame is blocked. The frame processing engine 204 sends the sky condition to the weather determination engine 212.

In another embodiment, the frame processing engine 204 analyzes a frame and generates an image analysis result for the frame. For example, the frame processing engine 204 analyzes a frame that is detected having tree presence and generates a mean brightness for the tree presence. Brightness is a visual perception attribute for an object that radiates or reflects light. For example, brightness is a visual perception caused by luminance of an object. A mean brightness is an average brightness of an object. The frame processing engine 204 sends the image analysis result including the mean brightness to the weather determination engine 212. The frame processing engine 204 is described below in more detail with reference to FIG. 2B.

The scene processing engine 206 is code and routines for determining a type of a scene captured by one or more frames and predicting a type of a future scene from the one or more frames. For example, the scene processing engine 206 receives one or more temporal patterns associated with one or more objects from the frame processing engine 204 and determines that a driver is driving in a forest scene based at least in part on the one or more temporal patterns. In one embodiment, the scene processing engine 206 retrieves the one or more temporal patterns from the storage 116. The scene processing engine 206 is communicatively coupled to the bus 241 via signal line 247. The scene processing engine 206 includes a scene determination module 208 and a scene prediction module 210. The components of the scene processing engine 206 are communicatively coupled to each other.

The scene determination module 208 is code and routines for determining a type of a scene. For example, the scene determination module 208 determines that the scene captured by the one or more frames is a forest scene based at least in part on the temporal patterns for tree presence in the one or more frames. In one embodiment, the scene determination module 208 receives temporal patterns for one or more objects from a temporal pattern module 236. The temporal pattern module 236 is described below with reference to FIG. 2B. In another embodiment, the scene determination module 208 retrieves the temporal patterns for the one or more objects from the storage 116.

Figure 6A:
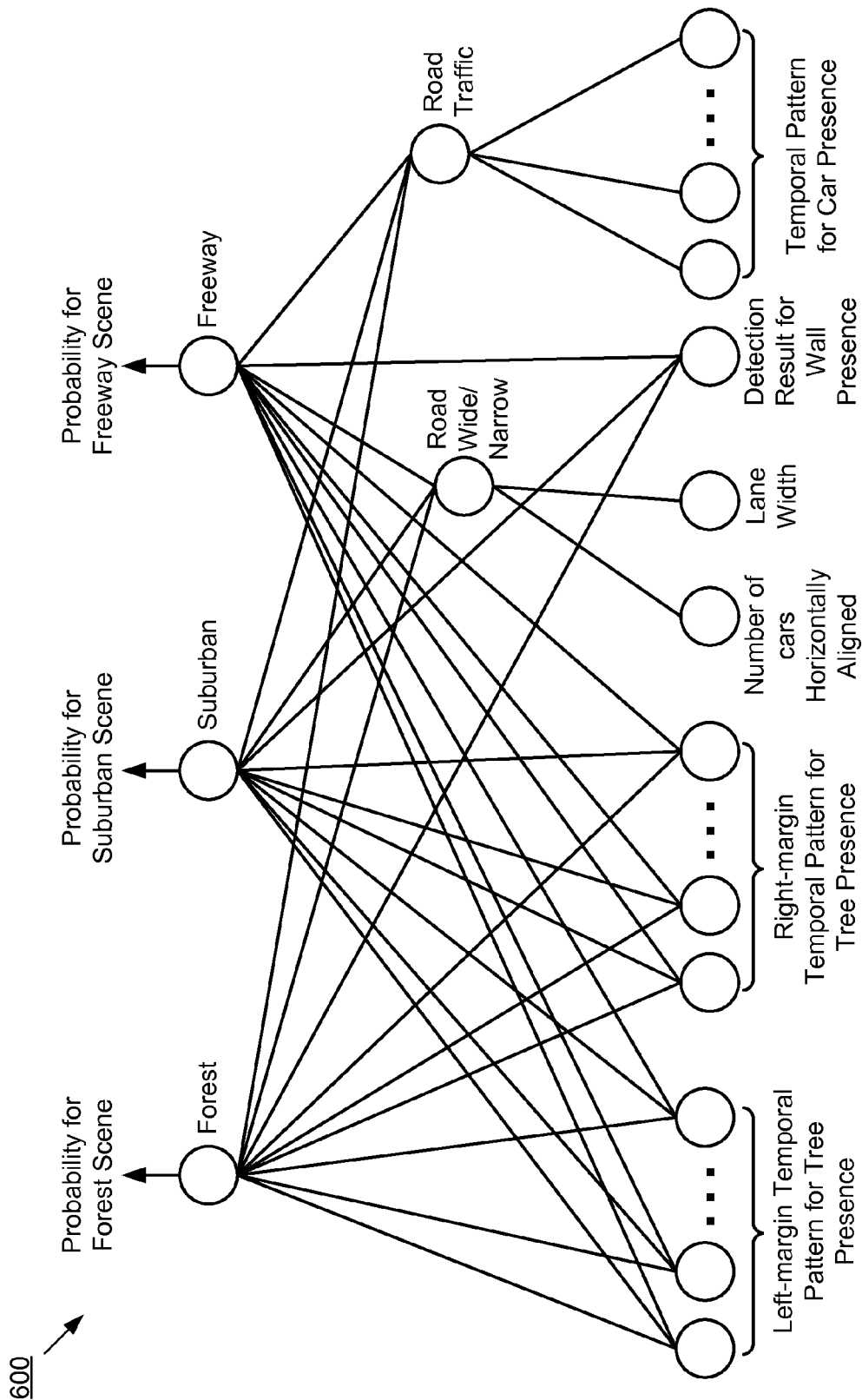
FIG. 6A is a graphic representation illustrating a scene determination network according to one embodiment.

The scene determination module 208 establishes a scene determination network for determining the type of the scene. A scene determination network is a model for scene determination. For example, a scene determination network is a Bayesian network. An example of a scene determination network is illustrated in FIG. 6A. In one embodiment, the scene determination module 208 retrieves data describing an algorithm for establishing the scene determination network from the storage 116 and establishes the scene determination network based at least in part on the algorithm.

The scene determination module 208 applies one or more temporal patterns for one or more objects as inputs to the scene determination network. For example, the scene determination engine 208 inputs one or more of the following to the scene determination network: a temporal pattern for tree presence in the left margins of the frames (e.g., a left-margin temporal pattern for tree presence); a temporal pattern for tree presence in the right margins of the frames (e.g., a right-margin temporal pattern for tree presence); a temporal pattern for house presence; a temporal pattern for wall presence, etc.

It is advantageous to apply temporal patterns for various objects (e.g., trees, walls, houses, etc.) as inputs to the scene determination network because, among other things, the objects are key factors to discriminate different scenes. For example, the presence of trees is a key factor to differentiate a forest scene from other types of scenes because only a forest scene is crowded with trees. Also, it is beneficial to use both the left-margin and right-margin temporal patterns to accelerate scene determination. For example, the incorporation of a left-margin temporal pattern for tree presence and a right-margin temporal pattern for tree presence facilitates determining whether a scene is a forest scene or a suburban scene. If the left-margin temporal pattern for tree presence indicates that the left-hand side of the scene is crowded with trees and the right-margin temporal pattern for tree presence indicates that the right-hand side of the scene only has sporadic trees, the scene determination module 208 determines that the scene is not a forest scene and is at most a suburban scene.

In one embodiment, the scene determination module 208 receives a wall detection result from an object detector 234 and applies the wall detection result as an input to the scene determination network. The object detector 234 is described below with reference to FIG. 2B. A wall detection result is a detection result indicating whether a wall is detected in a frame. In one embodiment, the wall detection result has a value of "1" indicating that a wall is detected in the frame. Alternatively, the wall detection result has a value of "0" indicating that no wall is detected in the frame.

In another embodiment, the scene determination module 208 receives road information from the road condition module 216 and applies the road information as inputs to the scene determination network. The road information is information associated with a road in a scene. For example, the road information includes one or more of the number of cars horizontally aligned on the road, the width of a lane on the road and a temporal pattern of car presence on the road, etc.

The road information is used by the scene determination network to generate one or more intermediate results. An intermediate result is a result generated by the scene determination network and also used as an input to the scene determination network. For example, the scene determination network applies the number of cars horizontally aligned on a road and the width of the road as inputs to generate an intermediate result describing whether the road is wide or narrow. As another example, the scene determination network applies the temporal pattern for car presence on the road as inputs to generate an intermediate result describing road traffic. The generated intermediate results are new inputs to the scene determination network. It is beneficial to generate intermediate results in a scene determination network because, among other things, it simplifies the structure of the network and allows a user to access the intermediate results. For example, if information about the road traffic is needed, a user is able to query the scene determination network for the intermediate result describing the road traffic.

Road traffic is traffic information associated with a road. In one embodiment, the road traffic includes one of the following states: no traffic; a medium traffic; a dense traffic; a heavily dense traffic; and a congested traffic. The road traffic information aids in the scene determination because different scenes have different traffic characteristics. For example, a congested traffic or a heavily dense traffic indicates that the scene is very likely to be an urban scene or a freeway scene. A dense traffic or a medium traffic indicates that the scene is very likely to be a suburban scene. No traffic indicates that the scene is very likely to be a forest scene.

In yet another embodiment, the scene determination module 208 receives sensor data from the sensor module 214 and applies the sensor data as inputs to the scene determination network. The sensor data includes one or more of data describing that a wiper is activated, data describing a temperature outside an automobile and other data generated by the sensor module 210.

The scene determination module 208 generates one or more probabilities for one or more scenes as outputs from the scene determination network. For example, the scene determination module 208 applies the scene determination network to generate a probability for a forest scene, a probability for a suburban scene and a probability for a freeway scene. A probability for a scene indicates the likelihood of the scene. For example, a probability for a forest scene with a value of 0.9 indicates that the percentage being a forest scene is 90%.

The scene determination module 208 determines the type of the scene based at least in part on the one or more probabilities. For example, assume that the scene determination module 208 generates a probability for a forest scene with a value of 0.7, a probability for a suburban scene with a value of 0.2 and a probability for a freeway with a value of 0.1 as outputs from the scene determination network. The scene determination module 208 determines that the scene is a forest scene since the probability for the forest scene is higher than the probabilities for the suburban scene and the freeway scene (e.g., 0.7>0.2 and 0.7>0.1).

In one embodiment, the scene determination module 208 trains the scene determination network before applying it to generate the one or more probabilities for scene determination. For example, the scene determination module 208 retrieves training data from the storage 116 and trains the scene determination network using the training data. The training of the scene determination network is a process to initialize the network. In one embodiment, the training of the network is a process to configure the scene determination network so that the scene determination network is ready for the scene determination.

The training data is data for training a network or a model. In one embodiment, the training data includes input data to the scene determination network (e.g., temporal patterns for one or more objects, road information, sensor data, etc.) and known output probabilities corresponding to the input data. For example, the training data includes input data corresponding to a forest scene, a probability for a forest scene with a value of 1 and probabilities for other types of scenes such as a suburban scene with a value of 0. One skilled in the art will recognize that the training data may include other input data and known output probabilities corresponding to other types of scenes.

It is particularly advantageous to employ a scene determination network such as a Bayesian network for the scene determination because, among other things, the scene determination network is able to incorporate various information such as information generated using computer vision techniques (e.g., a temporal pattern, etc.) and information generated through sensor deployments in an automobile (e.g., sensor data) to improve accuracy and efficiency for determining a scene. The scene determination network is a model having an open structure that is able to incorporate a variety of information for the scene determination.

The scene prediction module 210 is code and routines for predicting a future scene. In one embodiment, the scene prediction module 210 predicts a future scene based at least in part on one or more temporal patterns associated with one or more objects. For example, the scene prediction module 210 captures one or more scene progression characteristics based at least in part on the temporal patterns and predicts a future scene based at least in part on the scene progression characteristics. A scene progression characteristic is information describing how a scene surrounding a road is evolving. For example, a scene progression characteristic describes that the presence of trees is diminishing in the scene.

Figure 6B:
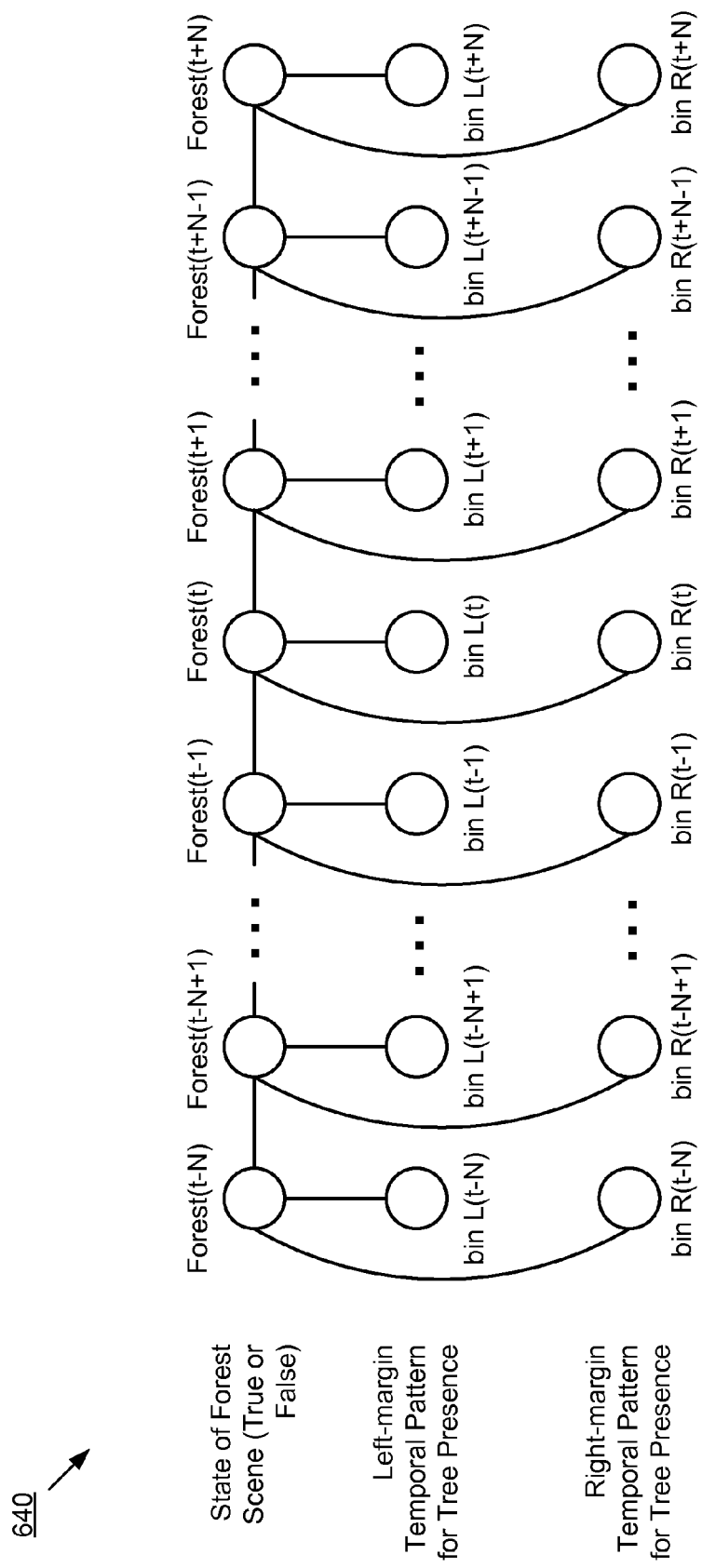
FIG. 6B is a graphic representation illustrating a scene prediction model according to one embodiment.

A scene prediction model is a model for capturing one or more scene progression characteristics in a scene and predicting one or more future scenes. In one embodiment, the scene prediction model is configured to estimate one or more past states of a scene, a current state of the scene and one or more future states of the scene. For example, a scene prediction model for a forest scene is a Hidden Markov model for estimating past states of the forest scene, a current state of the forest scene and future states of the forest scene. An example of a scene prediction model is illustrated in FIG. 6B.

A current time is a time when a latest frame is captured by the camera 110. In one embodiment, the current time is represented by the symbol "t." A past time is a time before the current time. A past time that is one time step before the current time is represented by "t−1." A time step is, for example, a time interval between two successive frames in a video. In one embodiment, the time step is a time interval between any number of frames in the video. Similarly, a past time that is "N" (e.g., N=1, 2, 3, 4 . . . ) time steps before the current time is represented by "t−N." A future time is a time after the current time. A future time that is "N" time steps after the current time is represented by "t+N." In one embodiment, a latest frame is captured by the camera 110 at the current time "t," and one or more frames are captured by the camera 110 at one or more past times (e.g., t−1, t−2 . . . t−N, etc.) respectively. The latest frame captured at the current time and the one or more frames captured at the past times are used to estimate past states and the current state of a scene and predict one or more future states of the scene at future time t+1, t+2 . . . t+N, etc.

A current state of a scene is a state ("true" or "false") of a scene at the current time. For example, a "true" current state of a forest scene (represented as "forest(t)=1") indicates that the scene at current time "t" is a forest scene. A "false" current state of a forest scene (represented as "forest(t)=0") indicates that the scene at current time "t" is not a forest scene. A past state of a scene is a state ("true" or "false") of a scene in the past. For example, a "true" past state of a forest scene at past time t−N (represented as "forest(t−N)=1") indicates that the scene at the past time t−N is a forest scene. A "false" past state of a forest scene at past time t−N (represented as "forest(t−N)=0") indicates that the scene at the past time t−N is not a forest scene. A future state of a scene is a state ("true" or "false") of a scene in the future. For example, a "true" future state of a forest scene at future time t+N (represented as "forest(t+N)=1") indicates that the scene at the future time t+N is a forest scene. A "false" future state of a forest scene at future time t+N (represented as "forest(t+N)=0") indicates that the scene at the future time t+N is not a forest scene.

The scene prediction model includes one or more sets of observed nodes and a set of hidden nodes. An observed node is a variable in the scene prediction model whose value is observed and known. For example, an observed node is a bin in a temporal pattern that is generated by the temporal pattern module 236. A set of observed nodes corresponds to all the bins in the temporal pattern as shown in FIG. 6B. A hidden node is a variable whose state is unknown and estimated by the scene prediction model. For example, a hidden node is one of a past state of a scene (e.g., a forest scene), a current state of the scene and a future state of the scene. The set of hidden nodes includes past states of the scene, a current state of the scene and future states of the scene as shown in FIG. 6B. The sets of observed nodes and hidden nodes are associated and interacted with each other according to the structure of the scene prediction model. In one embodiment, the scene prediction model includes other observed nodes (or variables) such as nodes for incorporating sensor data, road information, etc., to the scene prediction model.

In one embodiment, the scene prediction module 210 establishes a scene prediction model for a forest scene and applies the scene prediction model to estimate one or more of past states, a current state and future states of the forest scene. For example, the scene prediction module 210 receives temporal patterns from the temporal pattern module 236, inputs the temporal patterns to the scene prediction model and generates one or more past states, the current state and one or more future states of the forest scene as outputs from the scene prediction model. In one embodiment, the scene prediction module 210 applies Kalman filtering techniques and/or time series analysis to estimate the states of the forest scene. If the current state of the forest scene is true ("forest (t)=1"), the scene prediction module 210 determines that the scene is currently a forest scene. If the current state of the forest scene is false ("forest(t)=0"), the scene prediction module 210 determines that the scene is not a forest scene. If the future state of the forest scene at future time t+N is true ("forest(t+N)=1"), the scene prediction module 210 predicts that the future scene at future time t+N is a forest scene. If the future state of the forest scene at future time t+N is false ("forest(t+N)=0"), the scene prediction module 210 predicts that the future scene at future time t+N is not a forest scene.

Similarly, the scene prediction module 210 establishes a scene prediction model for other types of scenes (e.g., a suburban scene, a freeway scene, etc.) to estimate past states, a current state and future states for the other types of scenes. It is particularly beneficial to estimate future states of a scene because, for example, it provides a mechanism to estimate the time duration that a driver driving an automobile will stay in the same scene. For example, if future states of a forest scene from future time t+1 to future time t+N are true, the time duration that the driver stays in the forest scene is at least from the future time t+1 to the future time t+N.

The weather determination engine 212 is code and routines for determining a type of weather in a scene. For example, the weather determination engine 212 determines that the weather in the scene is one of sunny weather, cloudy weather, rainy weather and undetermined weather. Undetermined weather is weather that is unable to be determined by the weather determination engine 212. The weather determination engine 212 is communicatively coupled to the bus 241 via signal line 249.

Figure 6C:
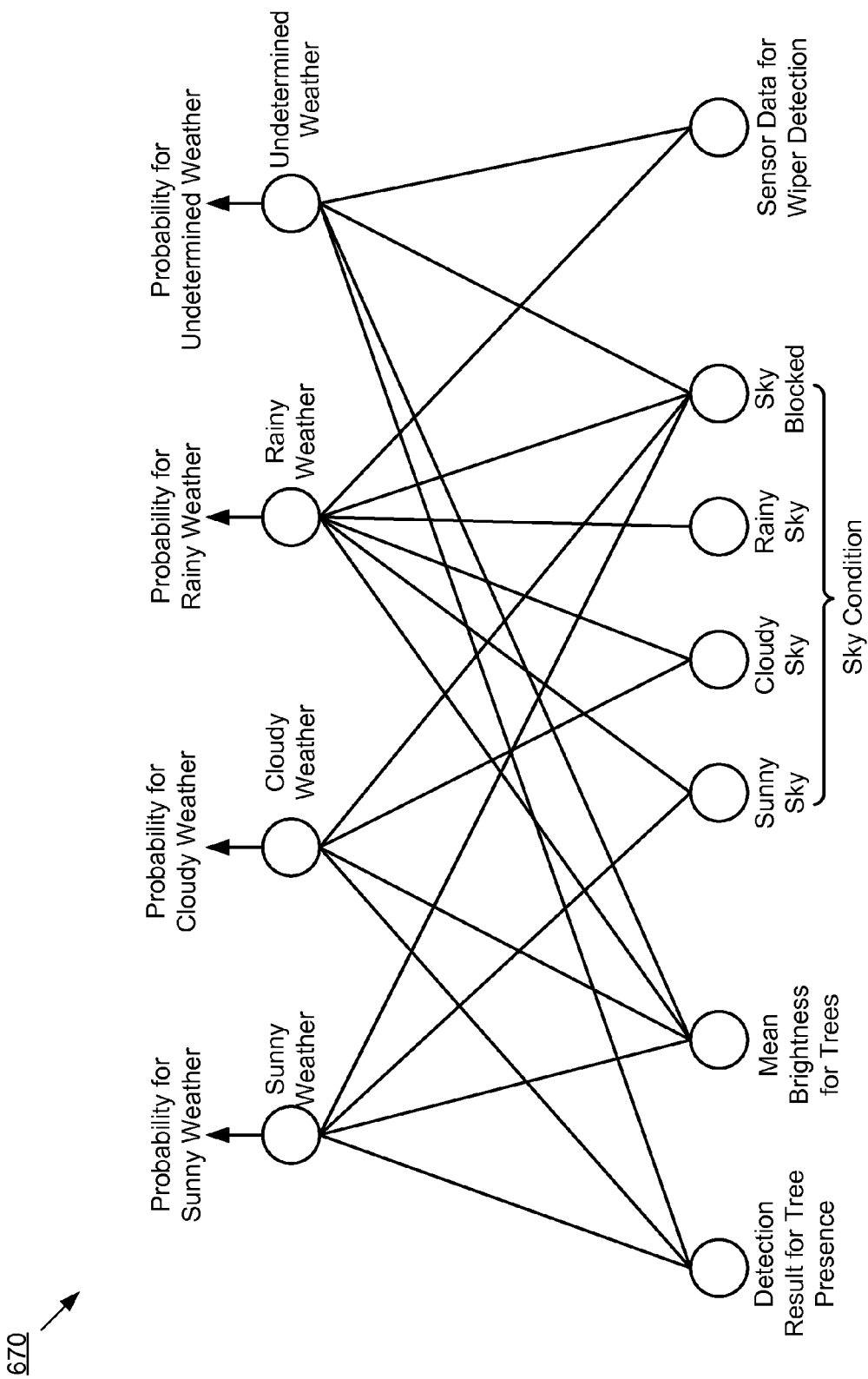
FIG. 6C is a graphic representation illustrating a weather detection network according to one embodiment.

In one embodiment, the weather determination engine 212 establishes a weather detection network for determining the type of the weather. A weather detection network is a model for weather determination. For example, a weather detection network is a Bayesian network. An example of a weather detection network is illustrated in FIG. 6C. In one embodiment, the weather determination engine 212 retrieves data describing an algorithm for establishing the weather detection network from the storage 116 and establishes the weather detection network based at least in part on the algorithm.

In one embodiment, the weather determination engine 212 receives one or more sky detection results describing the sky condition in a frame from a sky condition detector 238 and applies the one or more sky detection results as inputs to the weather detection network. The sky condition detector 238 is described below with reference to FIG. 2B. A sky detection result is a detection result describing the detected sky condition. A sky detection result describes a state ("true" or "false") of a sky condition. A "true" sky detection result for a sky condition has a value of 1 indicating that the sky condition is detected. For example, a sky detection result for sunny sky with a value of "1" indicates that the sky condition is sunny. A "false" sky detection result for a sky condition has a value of "0" indicating that the sky condition is not detected. For example, a sky detection result for sunny sky with a value of "0" indicates that the sky condition is not sunny.

In another embodiment, the weather determination engine 212 receives a detection result for tree presence in the frame from the object detector 234 and applies the detection result for tree presence as an input to the weather detection network. In yet another embodiment, the weather determination engine 212 receives an image analysis result (e.g., a mean brightness of trees) for the frame from the image analysis module 240 and applies the image analysis result as an input to the weather detection network. The utilization of the image analysis result such as a mean brightness of trees in the weather detection network is beneficial because, for example, the mean brightness of trees facilitates the determination of sunny weather by measuring the amount of luminance that the trees receive even if the sunny sky is blocked in the frame.

In yet another embodiment, the weather determination engine 212 receives sensor data describing activation of a wiper from the sensor module 214 and applies the sensor data as an input to the weather detection network. The sensor data is used by the weather detection network for discriminating rainy weather from cloudy weather since the wiper is activated only in rainy weather.

The weather determination engine 212 generates one or more probabilities for different types of weather as outputs from the weather detection network. For example, the weather determination engine 212 generates a probability for sunny weather, a probability for cloudy weather, a probability for rainy weather and a probability for undetermined weather as outputs from the weather detection network. A probability for a type of weather indicates the likelihood of the type of weather. For example, a probability for sunny weather with a value of 0.9 indicates that the percentage of sunny weather is 90%.

The weather determination engine 212 determines the type of weather based at least in part on the one or more generated probabilities. For example, assume that the weather determination engine 212 generates a probability for sunny weather with a value of 0.7, a probability for cloudy weather with a value of 0.2, a probability for rainy weather with a value of 0.1 and a probability for undetermined weather with a value of 0. The weather determination engine 212 determines that the weather is sunny since the probability for sunny weather is higher than the probabilities for other types of weather (e.g., 0.7>0.2, 0.7>0.1 and 0.7>0).

In one embodiment, the weather determination engine 212 trains the weather detection network before applying it to generate the one or more probabilities for weather determination. For example, the weather determination engine 212 retrieves training data from the storage 116 and trains the weather detection network using the training data. The training data includes input data to the weather detection network (e.g., one or more sky detection results describing the sky condition in a frame, a detection result for tree presence in the frame, a mean brightness of trees in the frame and sensor data describing activation of a wiper, etc.) and known output probabilities corresponding to the input data (e.g., a probability for rainy weather, a probability for sunny weather, etc.). In one embodiment, the weather determination engine 212 configures the weather detection network based at least in part on the training data so that the weather detection network is set to be ready for the weather determination.

The sensor module 214 is code and routines for generating sensor data. For example, the sensor module 214 receives a signal from a temperature-sensitive sensor 112 (e.g., a thermometer) and generates sensor data describing a temperature indicated by the signal. The sensor module 214 is communicatively coupled to the bus 241 via signal line 251. In one embodiment, the sensor module 214 receives a signal from a sensor 112 that is configured to detect motion of a wiper and generates sensor data describing the activation of the wiper. In other embodiments, the sensor module 214 receives signals from other sensors 112 and generates sensor data including other information. The sensor module 214 sends the sensor data to one or more of the scene determination module 208, the scene prediction module 210 and the weather determination engine 212. In one embodiment, the sensor module 214 stores the sensor data in the storage 116.

The road condition module 216 is code and routines for generating road information. For example, the road condition module 216 receives one or more frames from the camera 110 via the communication interface 202, processes the one or more frames and generates road information describing the road condition. The road information includes one or more of the number of cars horizontally aligned on the road, the width of a lane on the road and a temporal pattern for car presence on the road, etc. In one embodiment, the road condition module 216 detects presence of cars in the one or more frames and generates one or more detection results for the car presence. The road condition module 216 generates the temporal pattern for car presence based at least in part on the one or more detection results for car presence. The road condition module 216 is communicatively coupled to the bus 241 via signal line 253. The road condition module 216 sends the road information to one or more of the scene determination module 208, the scene prediction module 210 and the weather determination engine 212. In one embodiment, the road condition module 216 stores the road information in the storage 116.

The GUI module 218 is code and routines for generating graphical data for depicting a user interface. The GUI module 218 is communicatively coupled to the bus 241 via signal line 255. In one embodiment, the GUI module 218 generates graphical data for depicting a user interface for delivering a message to a user. For example, the GUI module 218 generates graphical data for depicting a user interface for notifying a user that he or she is leaving a forest scene and entering a suburban scene. In another embodiment, the GUI module 218 generates graphical data for depicting a user interface to allow a user to input information to the system 100. For example, the GUI module 218 generates graphical data for depicting a user interface with a "start" button, allowing a user to start filming a video describing the scene by pressing the "start" button. The GUI module 218 sends the graphical data to the display 114, causing the display 114 to present the user interface to the user.

Referring now to FIG. 2B, the frame processing engine 204 is described in more detail. FIG. 2B is a block diagram illustrating the frame processing engine 204 according to one embodiment. The frame processing engine 204 includes a downsampling module 232, an object detector 234, a temporal pattern module 236, a sky condition detector 238 and an image analysis module 240. These components of the frame processing engine 204 are communicatively coupled to the bus 241.

The downsampling module 232 is code and routines for downsampling one or more frames. The downsampling of a frame is a process that reduces the size of the frame by removing pixels from the frame. For example, the downsampling module 232 downsamples a frame with a size of 96×142 pixels to a low-resolution image with a size of 48×72 pixels. The downsampling module 232 receives a video including one or more frames from the camera 110 via the communication interface 202 and downsamples the one or more frames to one or more low-resolution images. In one embodiment, the downsampling module 232 downsamples a frame so that the frame after downsampling has a resolution specified by a user. For example, a frame after downsampling has a size of 48×72 pixels specified by a user. The downsampling module 232 sends the frames after downsampling to one or more of the object detector 234, the sky condition detector 238 and the image analysis module 240.

The object detector 234 is code and routines for detecting presence of an object in a frame. For example, the object detector 234 receives one or more frames from the downsampling module 232 and determines whether trees are present in the one or more frames. In one embodiment, the object detector 234 determines one or more objects that are to be detected in the one or more frames. For example, the object detector 234 determines to detect presence of trees, walls and houses in the one or more frames. The object detector 234 detects presence of each object separately. For example, the object detector 234 performs a first detection process to detect presence of trees in the one or more frames, a second detection process to detect presence of walls in the one or more frames and a third detection process to detect presence of houses in the one or more frames.

To detect presence of an object in a frame, the object detector 234 determines one or more sectors in the frame for the object detection. A sector is a portion of the frame. For example, a sector is a portion of the frame and has a size of 10×10 pixels. In one embodiment, the object detector 234 selects one or more sectors in a left margin and/or a right margin of the frame for object detection based at least in part on heuristic methods. Heuristic methods refer to experience-based techniques that speed up a process for solving a problem. For example, the heuristic methods indicate that trees are likely to be present in the left and right margins of the frame, because the left and right margins of the frame corresponds to the two sides of the road in the scene when the camera 110 is mounted in the front of an automobile and facing towards the road.

Figure 3A:
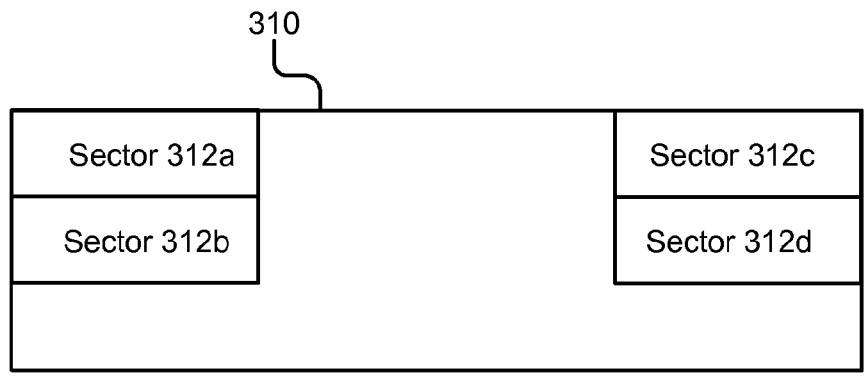
FIG. 3A is a graphic representation illustrating one or more sectors for tree detection in a frame according to one embodiment.
Figure 3B:
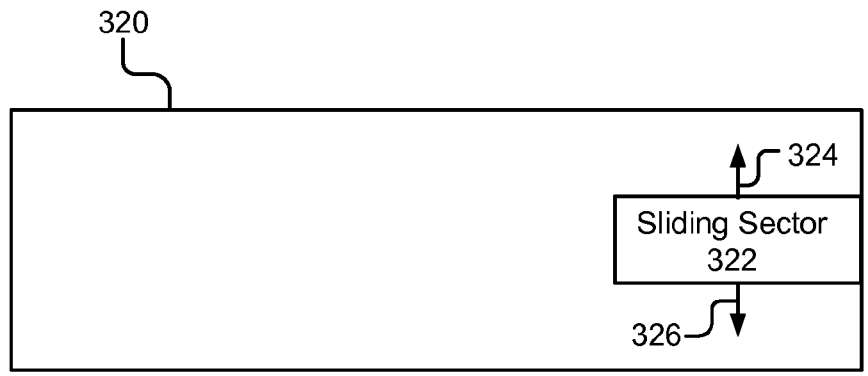
FIG. 3B is a graphic representation illustrating a sliding sector for wall detection in a frame according to one embodiment.

In one embodiment, the object detector 234 selects different sectors for detecting presence of different objects. For example, the object detector 234 selects two sectors in the left margin and two sectors in the right margin when detecting presence of trees in a frame as shown in FIG. 3A. As another example, the object detector 234 selects a sector (e.g., a sliding sector) on the right margin of the frame when detecting presence of walls as shown in FIG. 3B. A sliding sector is a sector that slides up and down along a margin of a frame. An example of a sliding sector is depicted in FIG. 3B.

The object detector 234 captures values for red color, green color and blue color for each pixel within each sector in the frame. The values for red color, green color and blue color are referred to as RGB values. The RGB values indicate light intensities of the red, green and blue colors for a pixel. The object detector 234 forms a vector including all the RGB values for each pixel within the one or more sectors.

Figure 4A:
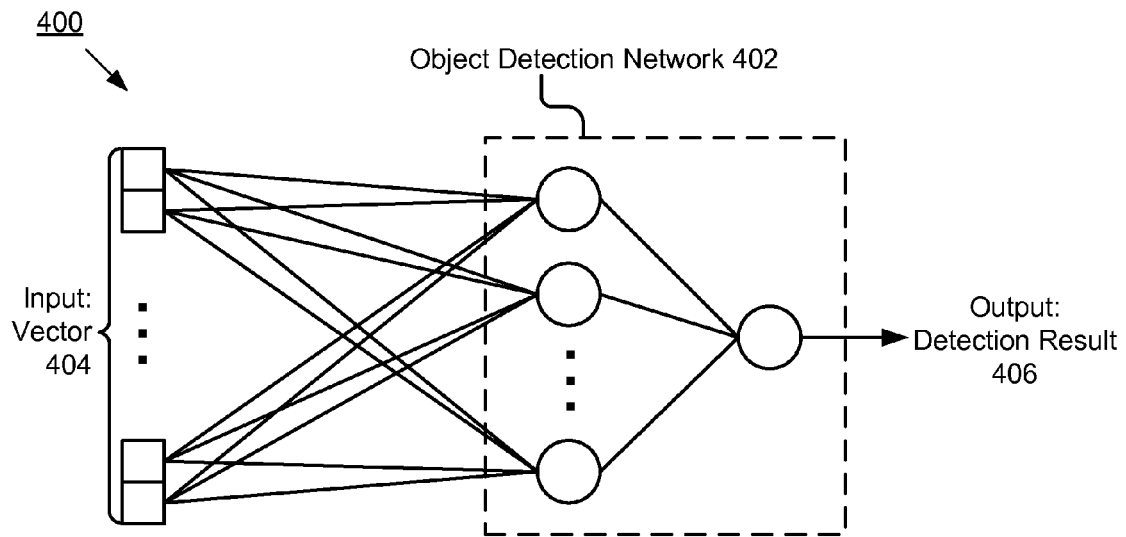
FIG. 4A is a graphic representation illustrating an object detection network for detecting presence of an object in a frame according to one embodiment.

The object detector 234 establishes an object detection network for detecting presence of an object in a frame. In one embodiment, the object detector 234 retrieves data describing an algorithm for establishing an object detection network from the storage 116 and establishes the object detection network based at least in part on the algorithm. An object detection network is a model for detecting presence of an object. For example, an object detection network is a feed-forward neural network. An example of an object detection network for detecting presence of an object is illustrated in FIG. 4A.

The object detector 234 applies the vector including RGB values as inputs to the object detection network and detects presence of the object in the frame using the object detection network. The object detector 234 generates a detection result as an output from the object detection network. The object detector 234 determines whether an object is present in the frame based at least in part on the detection result. For example, if the detection result is "1," the object detector 234 determines that presence of the object is detected in the frame. If the detection result is "0," the object detector 234 determines that presence of the object is not detected in the frame.

In one embodiment, the object detector 234 detects presence of an object in the left margin of a frame and generates a left-margin detection result for the frame. For example, the object detector 234 selects one or more sectors in the left margin of a frame and detects presence of trees in the left margin of the frame. The object detector 234 generates a left-margin detection result for tree presence in the frame. In another embodiment, the object detector 234 detects presence of the object in the right margin of a frame and generates a right-margin detection result for the frame. For example, the object detector 234 detects presence of trees in the right margin of a frame and generates a right-margin detection result for tree presence in the frame.

In one embodiment, the object detector 234 trains the object detection network before applying it to generate a detection result for object detection in a frame. For example, the object detector 234 retrieves training data from the storage 116 and trains the object detection network using the training data. The training data includes input data to the object detection network (e.g., a vector including RGB values, etc.) and a known detection result corresponding to the input data (e.g., a detection result with a value of "1" or "0"). In one embodiment, the object detector 234 configures the object detection network based at least in part on the training data so that the object detection network is ready for the detection of the object.

To detect presence of an object in a plurality of frames, the object detector 234 performs the above-described operations for detecting presence of an object in a frame to each frame of the plurality of frames. The object detector 234 generates a detection result for each of the plurality of frames, so that a plurality of detection results is generated for the object. If there is more than one object to be detected in the plurality of frames, the object detector 234 detects presence of each of the objects in the plurality of frames independently and generates a plurality of detection results for each of the objects. The object detector 234 stores the detection results in the storage 116. In one embodiment, the object detector 234 sends the detection results to the temporal pattern module 236.

The temporal pattern module 236 is code and routines for generating one or more temporal patterns for one or more objects. In one embodiment, the temporal pattern module 236 receives one or more detection results for an object from the object detector 234. In another embodiment, the temporal pattern module 236 retrieves one or more detection results for an object from the storage 116. The temporal pattern module 236 generates a temporal pattern for the object based at least in part on the one or more detection results. For example, the temporal pattern module 236 generates a temporal pattern for wall presence based at least in part on one or more detection results for wall presence in one or more frames.

Figure 5:
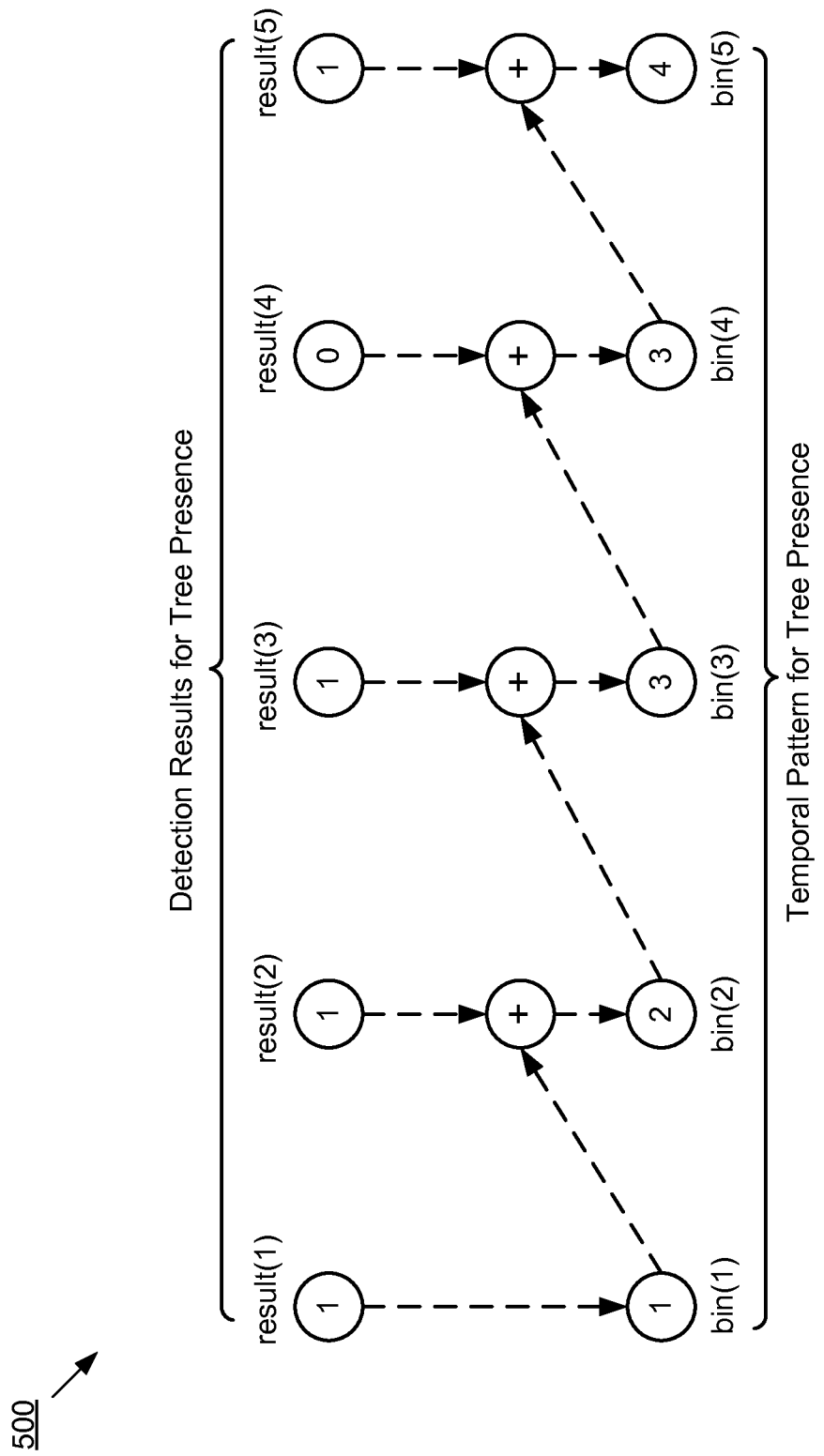
FIG. 5 is a graphic representation illustrating a process to generate a temporal pattern for an object according to one embodiment.

In one embodiment, the temporal pattern module 236 generates a left-margin temporal pattern for an object based at least in part on one or more left-margin detection results for the object in one or more frames. For example, the temporal pattern module 236 generates a left-margin temporal pattern for tree presence using one or more left-margin detection results for tree presence. In another embodiment, the temporal pattern module 236 generates a right-margin temporal pattern for an object based at least in part on one or more right-margin detection results for the object in one or more frames. The generation of a temporal pattern using one or more detection results is described below in more detail. An example of a process for temporal pattern generation is also illustrated in FIG. 5.

A temporal pattern includes one or more bins describing distribution of object presence in the one or more frames. A first bin of the temporal pattern is represented as "bin(1)." A second bin of the temporal pattern is represented as "bin(2)." Similarly, a $N^{th}$ bin of the temporal pattern is represented as "bin(N)." A first detection result for the object is represented as "result(1)." A second detection result for the object is represented as "result(2)." Similarly, a $N^{th}$ detection result for the object is represented as "result(N)." Assume the temporal pattern module 236 receives N detection results for the object from the object detector 234. One skilled in the art will recognize that N can be any number such as 10, 22, 30, etc. Correspondingly, the temporal pattern module 236 generates a temporal pattern including N bins. The N detection results are represented as result(1), result(2) . . . result(N) and the N bins are represented as bin(1), bin(2) . . . bin(N). The values for the bins are calculated based at least in part on the detection results. The value for the first bin is the same as the first detection result (represented as "bin(1)=result(1)"). The value for the second bin is the sum of the value for the first bin and the second detection result (represented as "bin(2)=bin(1)+result(2)"). Similarly, a value for an $N^{th}$ bin is the sum of the value for the $(N-1)^{th}$ bin and an $N^{th}$ detection result (represented as "bin(N)=bin(N−1)+result(N)"). The following Table 1 summarizes the calculation process for the values of the bins.

TABLE 1

Calculating values for bins in a temporal pattern including N bins

| bin | value calculation |
|---|---|
| bin(1) | bin(1) = result(1) |
| bin(2) | bin(2) = bin(1) + result(2) |
| . | . |
| . | . |
| . | . |
| bin(N) | bin(N) = bin(N − 1) + result(N) |

Figure 3C:
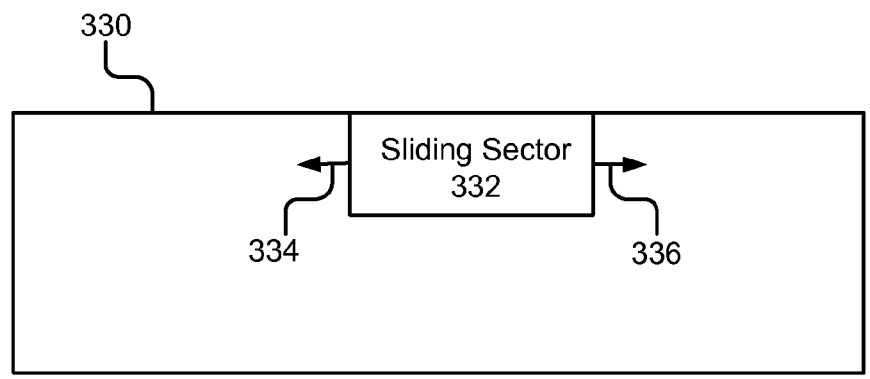
FIG. 3C is a graphic representation illustrating a sliding sector for sky condition determination according to one embodiment.

The sky condition detector 238 is code and routine for detecting a sky condition in a frame. The sky condition detector 238 receives a frame from the downsampling module 232 and selects a sector in the frame. In one embodiment, the selected sector has a size of 10×10 pixels. An example of a selected sector is illustrated in FIG. 3C. The sky condition detector 238 captures RGB values for each pixel in the sector and forms a vector including all the RGB values for the pixels in the sector.

Figure 4B:
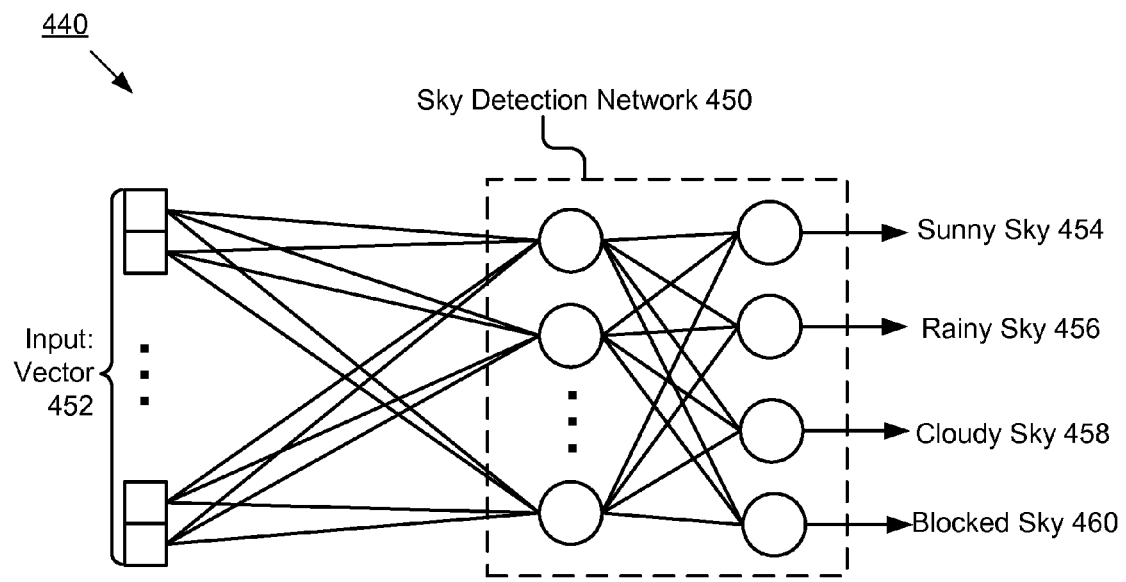
FIG. 4B is a graphic representation illustrating a sky detection network for determining a sky condition in a frame according to one embodiment.

The sky condition detector 238 establishes a sky detection network for detecting a sky condition in a frame. In one embodiment, the sky condition detector 238 retrieves data describing an algorithm for establishing a sky detection network from the storage 116 and establishes the sky detection network based at least in part on the algorithm. A sky detection network is a model for detecting a sky condition in a frame. For example, a sky detection network is a feed-forward neural network. An example of a sky detection network is illustrated in FIG. 4B. The sky condition detector 238 applies the vector including RGB values as inputs to the sky detection network and generates one or more sky detection results as outputs from the sky detection network. For example, the sky condition detector 238 generates a sky detection result for sunny sky with a value of "1," a sky detection result for rainy sky with a value of "0," a sky detection result for cloudy sky with a value of "0" and a sky detection result for blocked sky with a value of "0."

In one embodiment, the sky condition detector 238 trains the sky detection network before applying it to generate one or more sky detection results. For example, the sky condition detector 238 retrieves training data from the storage 116 and trains the sky detection network using the training data. The training data includes input data to the sky detection network (e.g., a vector including RGB values, etc.) and one or more known sky detection results corresponding to the input data. The sky condition detector 238 configures the sky detection network based at least in part on the training data so that the sky detection network is ready for the detection of the sky condition.

The image analysis module 240 is code and routines for analyzing a frame and generating an image analysis result such as a mean brightness for an object in the frame. For example, the image analysis module 240 measures an amount of luminance for trees detected in a frame and generates a mean brightness for the tree presence in the frame. In one embodiment, brightness of a pixel is determined based at least in part on the RGB values for the pixel. For example, brightness of the pixel is an average of a value for red color, a value for green color and a value for blue color of the pixel. In one embodiment, the image analysis module 240 determines a mean brightness for an object (e.g., trees) as an average of brightness for all the pixels in a frame in which the presence of the object (e.g., tree presence) is detected.

Graphic Representations

Referring now to FIGS. 3A-6C, various embodiments of graphic representations of the specification will be described. FIG. 3A is a graphic representation illustrating one or more sectors for tree detection in a frame 310 according to one embodiment. In the illustrated embodiment, the object detector 234 selects a first sector 312a and a second sector 312b in a left margin of the frame 310 to detect tree presence in the left margin. The object detector 234 also selects a third sector 312c and a fourth sector 312d in a right margin of the frame 310 to detect tree presence in the right margin. In one embodiment, the frame 310 is an image downsampled by the downsampling module 232 having a size of 48×72 pixels and the sectors 312a, 312b, 312c and 312d are portions of the image each having a size of 10×10 pixels.

FIG. 3B is a graphic representation illustrating a sliding sector for wall detection in a frame 320 according to one embodiment. The object detector 234 selects a sector 322 in a right margin of the frame 320 to detect presence of a wall. The sector 322 is referred to as a sliding sector. An arrow 324 indicates that in one embodiment the sector 322 slides up along the right margin of the frame 320 by a predetermined amount of pixels (e.g., 5 pixels). An arrow 326 indicates that in another embodiment the sector 322 slides down along the right margin of the frame 320 by a predetermined amount of pixels. In one embodiment, the frame 320 is an image downsampled by the downsampling module 232 having a size of 48×72 pixels and the sector 322 is a portion of the image having a size of 10×10 pixels. One skilled in the art will recognize that in other embodiments another sliding sector can be implemented in a left margin of the frame 320 to detect wall presence in the left margin.

FIG. 3C is a graphic representation illustrating a sliding sector for determining a sky condition in a frame 330 according to one embodiment. The sky condition detector 238 selects a sector 332 to detect a sky condition in the frame 330. The sector 332 is referred to as a sliding sector. An arrow 334 indicates that in one embodiment the sector 332 slides along the margin of the frame 330 to the left by a predetermined amount of pixels (e.g., 5 pixels). An arrow 336 indicates that in another embodiment the sector 332 slides along the margin of the frame 330 to the right by a predetermined amount of pixels. In one embodiment, the frame 330 is an image downsampled by the downsampling module 232 having a size of 48×72 pixels and the sector 332 is a portion of the image having a size of 10×10 pixels.

FIG. 4A is a graphic representation 400 illustrating an object detection network 402 for detecting presence of an object in a frame according to one embodiment. In one embodiment, the object detection network 402 is a feed-forward neural network. The object detection network 402 takes a vector 404 including RGB values as inputs and generates a detection result 406 for the object as an output. The detection result 406 has a value of "1" if the object is detected in the frame. Alternatively, the detection result 406 has a value of "0" if the object is not detected in the frame.

FIG. 4B is a graphic representation 440 illustrating a sky detection network 450 for determining a sky condition in a frame according to one embodiment. In one embodiment, the sky detection network 450 is a feed-forward neural network. The sky detection network 450 applies a vector 452 including RGB values as inputs and generates one or more sky detection results as outputs. The one or more sky detection results have either a "true" state or a "false" state. For example, if the sunny sky is detected in the frame, the sky detection network 450 generates a sky detection result for sunny sky 454 having a "true" state (or, having a value of "1"), a sky detection result for rainy sky 456 having a "false" state (or, having a value of "0"), a sky detection result for cloudy sky 458 having a "false" state and a sky detection result for blocked sky 460 having a "false" state.

FIG. 5 is a graphic representation 500 illustrating a process to generate a temporal pattern according to one embodiment. In the illustrated embodiment, the temporal pattern module 236 receives five detection results for tree presence from the object detector 234. One skilled in the art will recognize that the temporal pattern module 236 may receive any number of detection results and generates a temporal pattern for the any number of detection results. The five detection results are associated with five frames in a video. In one embodiment, the five frames are five successive frames in the video. For example, the temporal pattern module 236 receives a first detection result represented as "result(1)" for a first frame, a second detection result represented as "result(2)" for a second frame, a third detection result represented as "result(3)" for a third frame, a fourth detection result represented as "result(4)" for a fourth frame and a fifth detection result represented as "result(5)" for a fifth frame. The "result(1)" has a value of "1," indicating that trees are detected in the first frame. Similarly, the "result(2)," "result(3)" and "result(5)" each have a value of "1." The "result(4)" has a value of "0," indicating that trees are not detected in the fourth frame.

The temporal pattern module 236 generates a temporal pattern for tree presence based at least in part on the detection results. As shown in FIG. 5, the temporal pattern module 236 generates a temporal pattern including five bins represented as "bin(1)," "bin(2)," "bin(3)," "bin(4)" and "bin(5)," respectively. The temporal pattern module 236 sets a value for "bin(1)" as the same value for "result(1)" (e.g., bin(1)=result(1)). The temporal pattern module 236 calculates a value for "bin(2)" as the sum of "result(1)" and "bin(2)" (e.g., bin(2)=bin(1)+result(2)). Similarly, the temporal pattern module 236 calculates values for "bin(3)," "bin(4)" and "bin(5)" as following: bin(3)=bin(2)+result(3); bin(4)=bin(3)+result(4); and bin(5)=bin(4)+result(5). One skilled in the art will recognize that the temporal pattern module 236 may generate a temporal pattern including any number of bins using the same process described above.

FIG. 6A is a graphic representation 600 illustrating a scene determination network according to one embodiment. In one embodiment, the scene determination network is a Bayesian network. The scene determination network applies every bin in one or more temporal patterns as an input to the network. For example, the scene determination network uses each bin in a left-margin temporal pattern for tree presence as an input to the network. Additionally, the scene determination network also uses each bin in a right-margin temporal pattern for tree presence as an input to the network. In the illustrated embodiment, the scene determination network also applies a detection result for wall presence as an input to the network. In other embodiments, the scene determination network applies each bin in a temporal pattern for wall presence as an input to the network.

The scene determination network also takes road information such as the number of cars horizontally aligned and the lane width as inputs to the network and generates an intermediate result describing whether the road is wide or narrow. Additionally, the scene determination network takes each bin of a temporal pattern for car presence as an input and generates an intermediate result describing road traffic. The generated intermediate results are used as new inputs to the network for the generation of one or more probabilities for one or more scenes. One skilled in the art will recognize that the scene determination network may include other inputs such as temporal patterns for house presence, sensor data, etc.

The scene determination network generates one or more probabilities for one or more scenes based at least in part on the inputs. For example, the scene determination network generates a first probability for a forest scene, a second probability for a suburban scene and a third probability for a freeway scene. One skilled in the art will recognize that the scene determination network may also generate probabilities for other scenes such as an urban scene, etc.

FIG. 6B is a graphic representation 640 illustrating a scene prediction model for a forest scene according to one embodiment. In one embodiment, the scene prediction model is a Hidden Markov model. The current time is represented as "t." The symbol "t−N" represents N time steps before the current time and the symbol "t+N" represents N time step after the current time. One skilled in the art will recognize that N can be any number such as 5, 10, 20, etc. The scene prediction model includes a set of hidden nodes such as a current state for the forest scene (e.g., forest(t)), one or more past states for the forest scene (e.g., forest(t−N), forest(t−N+1) . . . forest(t−1)) and one or more future states for the forest scene (e.g., forest(t+1) . . . forest(t+N−1), forest(t+N)). One skilled in the art will recognize that the scene prediction model may include any number of hidden nodes in a set.

The scene prediction model also includes one or more sets of observed nodes such as bins in a left-margin temporal pattern for tree presence (e.g., bin L(t−N), bin L(t−N+1) . . . bin L(t−1), bin L(t), bin L(t+1) . . . bin L(t+N−1), bin L(t+N)) and bins in a right-margin temporal pattern for tree presence (e.g., bin R(T−N), bin R(t−N+1) . . . bin R(t−1), bin R(t), bin R(t+1) . . . bin R(t+N−1), bin R(t+N)). One skilled in the art will recognize that the scene prediction model may include any number of observed nodes in a set. In other embodiments, the scene determination network also includes other types of observed nodes such as bins in a temporal pattern for wall presence, bins in a temporal pattern for house presence, road information and sensor data, etc.

The scene prediction model estimates states for the one or more hidden nodes based at least in part on the one or more observed nodes. For example, the scene prediction module 210 applies Kalman filtering techniques and/or time series analysis when using the scene prediction model to estimate states of the forest scene such as forest(t), forest(t+1) . . . forest(t+N−1), forest(t+N). One skilled in the art will recognize that similar scene prediction models may be established for estimating states for other scenes such as a suburban scene, a freeway scene, etc.

FIG. 6C is a graphic representation 670 illustrating a weather detection network according to one embodiment. In one embodiment, the weather detection network is a Bayesian network. The weather detection network uses one or more of the following as inputs to the network: a detection result for tree presence in a frame from the object detector 234; a mean brightness for trees in the frame from the image analysis module 240; one or more sky detection results (e.g., sunny sky, cloudy sky, rainy sky, sky blocked, etc.) for the sky condition from the sky condition detector 238; and sensor data for wiper detection from the sensor module 214, etc. The weather detection network generates one or more probabilities for one or more types of weather as outputs. For example, the weather detection network generates a first probability for sunny weather, a second probability for cloudy weather, a third probability for rainy weather and a fourth probability for undetermined weather.

Methods

Figure 7:
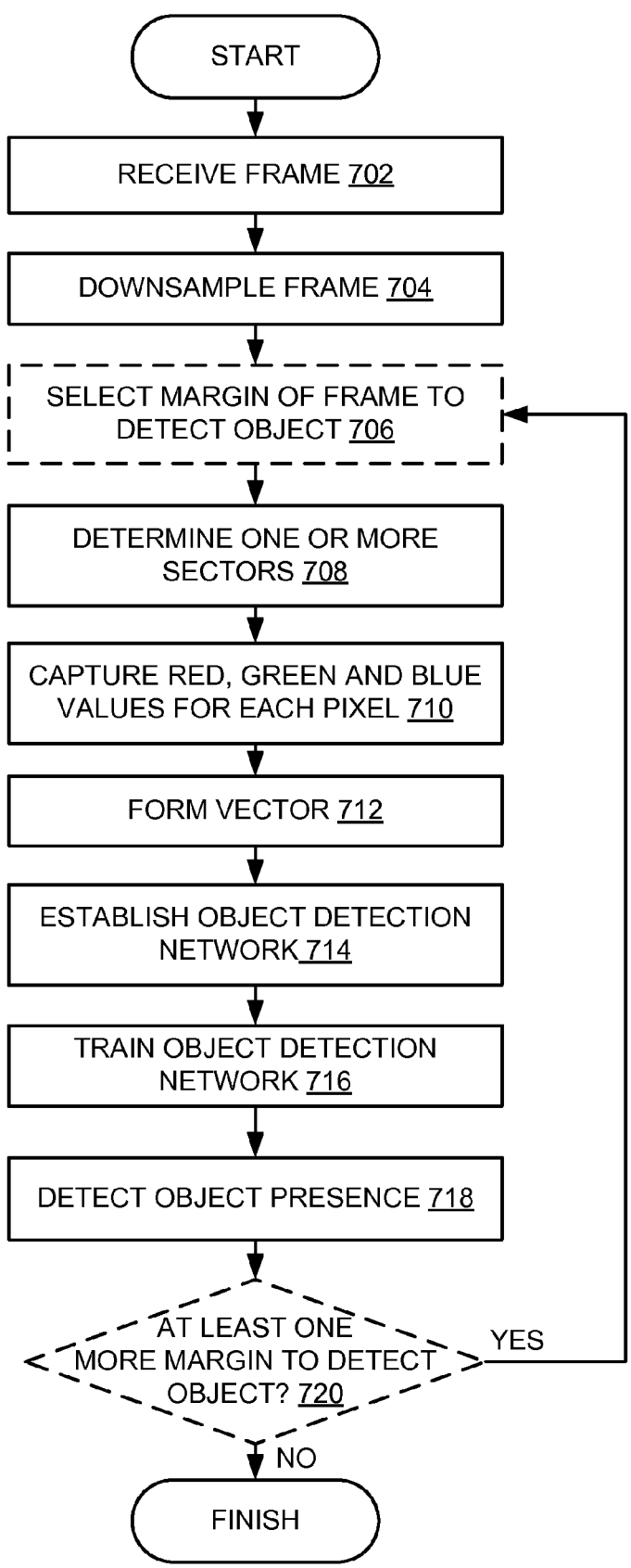
FIG. 7 is a flow diagram illustrating a method for detecting presence of an object in a frame according to one embodiment.

Referring now to FIGS. 7-12B, various embodiments of the method of the specification will be described. FIG. 7 is a flow diagram illustrating a method 700 for detecting presence of an object in a frame according to one embodiment. The communication interface 202 receives 702 a frame from the camera 110. In one embodiment, the communication interface 202 receives a video including one or more frames from the camera 110 and steps 704-720 of the method 700 described below are performed to each of the one or more frames separately. The communication interface 202 sends the frame to the downsampling module 232. The downsampling module 232 downsamples 704 the frame and sends the frame after downsampling to the object detector 234.

In one embodiment, the object detector 234 selects 706 a margin of the frame to detect presence of the object. For example, the object detector 234 selects a left margin or a right margin of the frame to detect presence of the object. Step 706 is depicted using a dashed line to indicate that it is an optional feature to the method 700. The object detector 234 determines 708 one or more sectors in the frame to detect presence of the object. In one embodiment, the object detector 234 determines one or more sectors in the selected margin of the frame to detect presence of the object. The object detector 234 captures 710 values for red color, green color and blue color (RGB values) for each pixel in the one or more sectors. The object detector 234 forms 712 a vector including the RGB values for each pixel in the one or more sectors.

The object detector 234 establishes 714 an object detection network for detecting presence of the object. For example, the object detector 234 establishes a feed-forward neural network for detecting presence of the object. The object detector 234 retrieves training data for the object detection network from the storage 116 and trains 716 the object detection network based at least in part on the training data. The object detector 234 applies the vector including the RGB values as inputs to the object detection network and detects 718 presence of the object to generate a detection result using the object detection network. For example, the object detector 234 determines that the object is present in the frame if the detection result is "1." Alternatively, the object detector 234 determines that the object is not present in the frame if the detection result is "0."

Optionally, the object detector 234 determines 720 whether there is at least one more margin to detect presence of the object. If there is at least one additional margin for the object detection, the method 700 moves to step 706. Otherwise, the method 700 ends.

Figure 8:
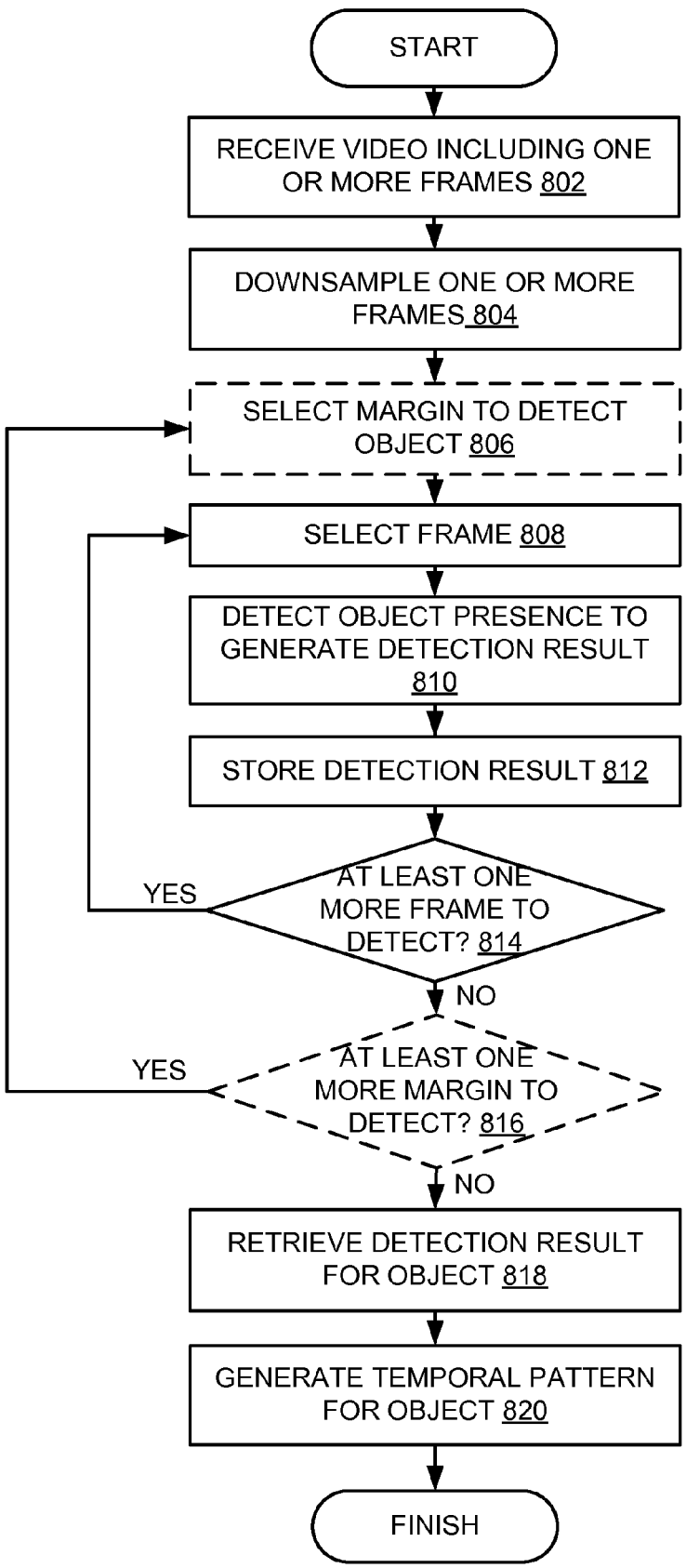
FIG. 8 is a flow diagram illustrating a method for generating a temporal pattern for an object according to one embodiment.

FIG. 8 is a flow diagram illustrating a method 800 for generating a temporal pattern for an object according to one embodiment. The communication interface 202 receives 802 a video including one or more frames from the camera 110 and sends the one or more frames to the downsampling module 232. The downsampling module 232 downsamples 804 the one or more frames. The one or more frames after downsampling are sent to the object detector 234.

In one embodiment, the object detector 234 selects 806 a margin (e.g., a left margin or a right margin) to detect presence of the object in the one or more frames. The object detector 232 selects 808 a frame from the one or more frames for the object detection. For example, the object detector 232 selects a frame that is not detected for presence of the object yet from the one or more frames. The object detector 234 detects 810 presence of the object in the selected frame to generate a detection result for the selected frame. For example, the object detector 234 performs steps similar to the steps 708-718 described above with reference to FIG. 7 to detect presence of the object in the selected frame. The object detector 234 stores 812 the detection result in the storage 116.

The object detector 234 determines 814 whether there is at least one more frame in the one or more frames to be detected for presence of the object. If there is at least one more frame to be detected, the method 800 moves to step 808. Otherwise, the method 800 moves to step 816. At step 816, the object detector 234 determines whether there is at least one more margin to detect presence of the object. If there is at least one more margin to detect the object, the method 800 moves to step 806. Otherwise, the method 800 moves to step 818. Step 816 is depicted using a dashed line to indicate that it is optional to the method 800.

At step 818, the temporal pattern module 236 retrieves one or more detection results for the object associated with the one or more frames from the storage 116. The temporal pattern module 236 generates 820 a temporal pattern for the object based at least in part on the one or more detection results. In one embodiment, the temporal pattern module 236 generates a left-margin temporal pattern and/or a right-margin temporal pattern for the object.

Figure 9:
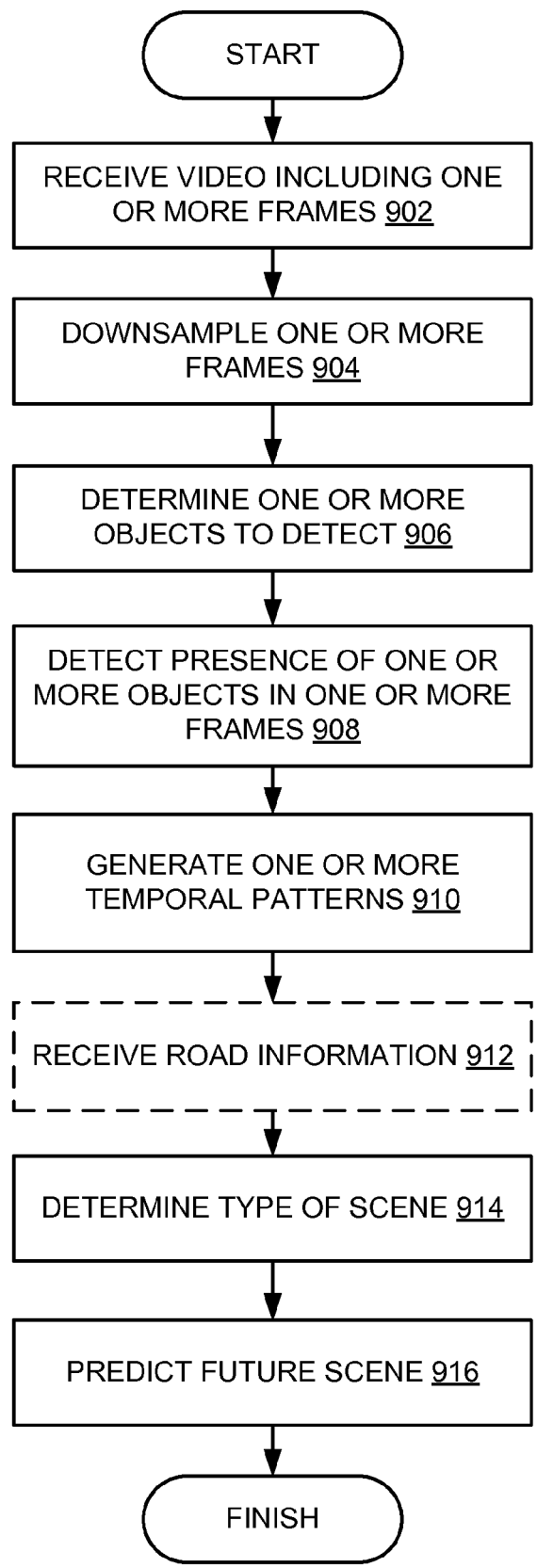
FIG. 9 is a flow diagram illustrating a method for scene determination and prediction according to one embodiment.

FIG. 9 is a flow diagram illustrating a method 900 for scene determination and prediction according to one embodiment. The communication interface 202 receives 902 a video including one or more frames from the camera 110 and sends the one or more frames to the downsampling module 232. The downsampling module 232 downsamples 904 the one or more frames. The one or more frames after downsampling are sent to the object detector 234.

The object detector 234 determines 906 one or more objects to detect in the one or more frames. For example, the object detector 234 determines to detect presence of trees, walls, houses, etc., in the one or more frames. The object detector 234 detects 908 the presence of the one or more objects in the one or more frames. For example, the object detector 234 performs steps similar to the steps 806-816 described above with reference to FIG. 8 for each of the one or more objects and generates one or more detection results for each of the one or more objects.

The temporal pattern module 236 generates 910 one or more temporal patterns for the one or more objects. For example, the temporal pattern module 236 generates a temporal pattern for each of the one or more objects based at least in part on the one or more detection results for the object. The scene determination module 208 optionally receives 912 road information from the road condition module 216. In one embodiment, the scene determination module 208 additionally receives sensor data from the sensor module 214. In one embodiment, the scene determination module 208 determines 914 a type of the scene based at least in part on one or more of the temporal patterns, the road information and the sensor data.

In one embodiment, the scene prediction module 210 receives one or more of the temporal patterns from the temporal pattern module 236, the road information from the road condition module 216 and the sensor data from the sensor module 214. The scene prediction module 210 predicts 916 a future scene based at least in part on one or more of the temporal patterns, the road information and the sensor data.

Figure 10A:
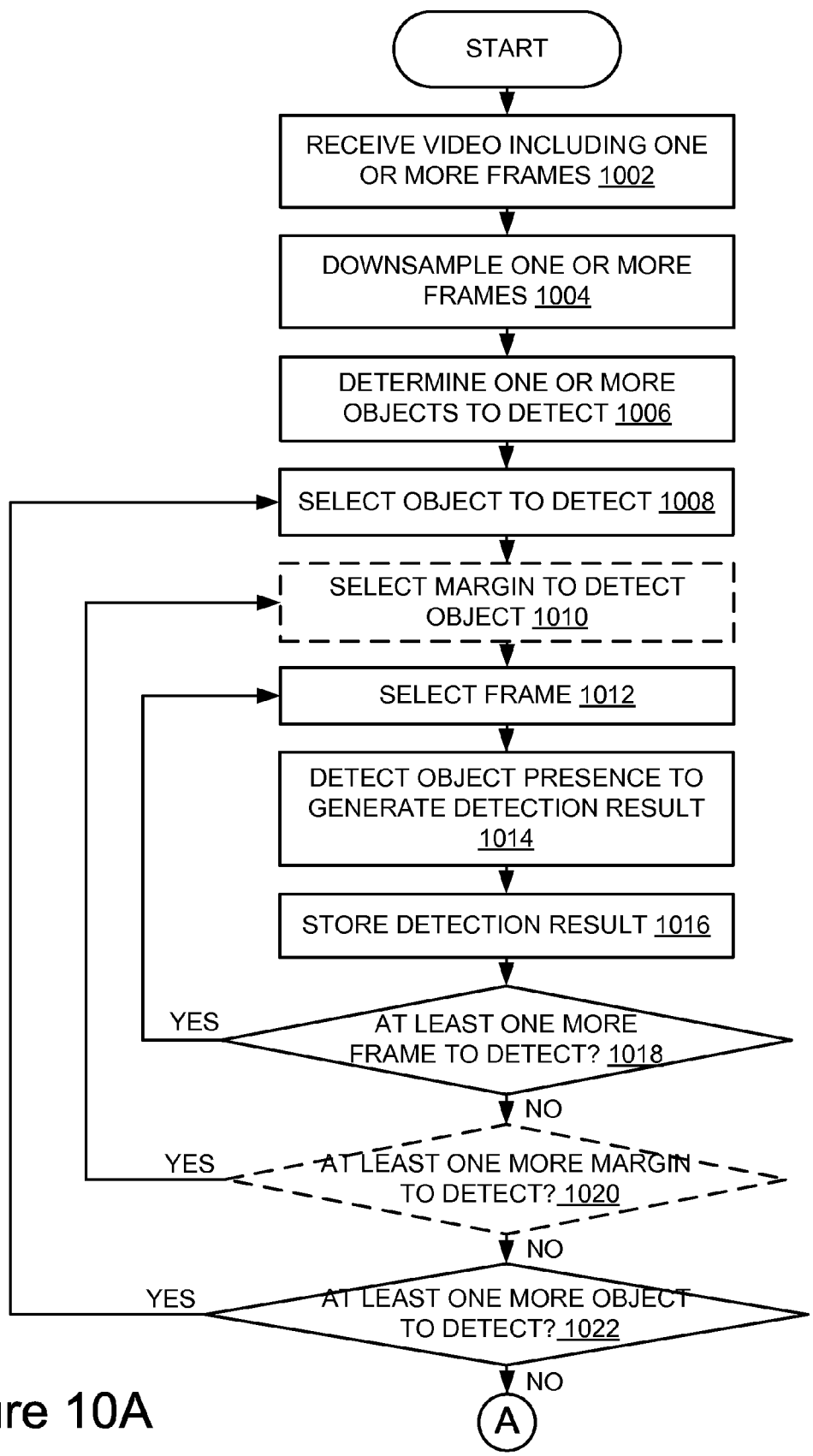
FIGS. 10A-10C are flow diagrams illustrating a method for scene determination according to one embodiment.
Figure 10B:
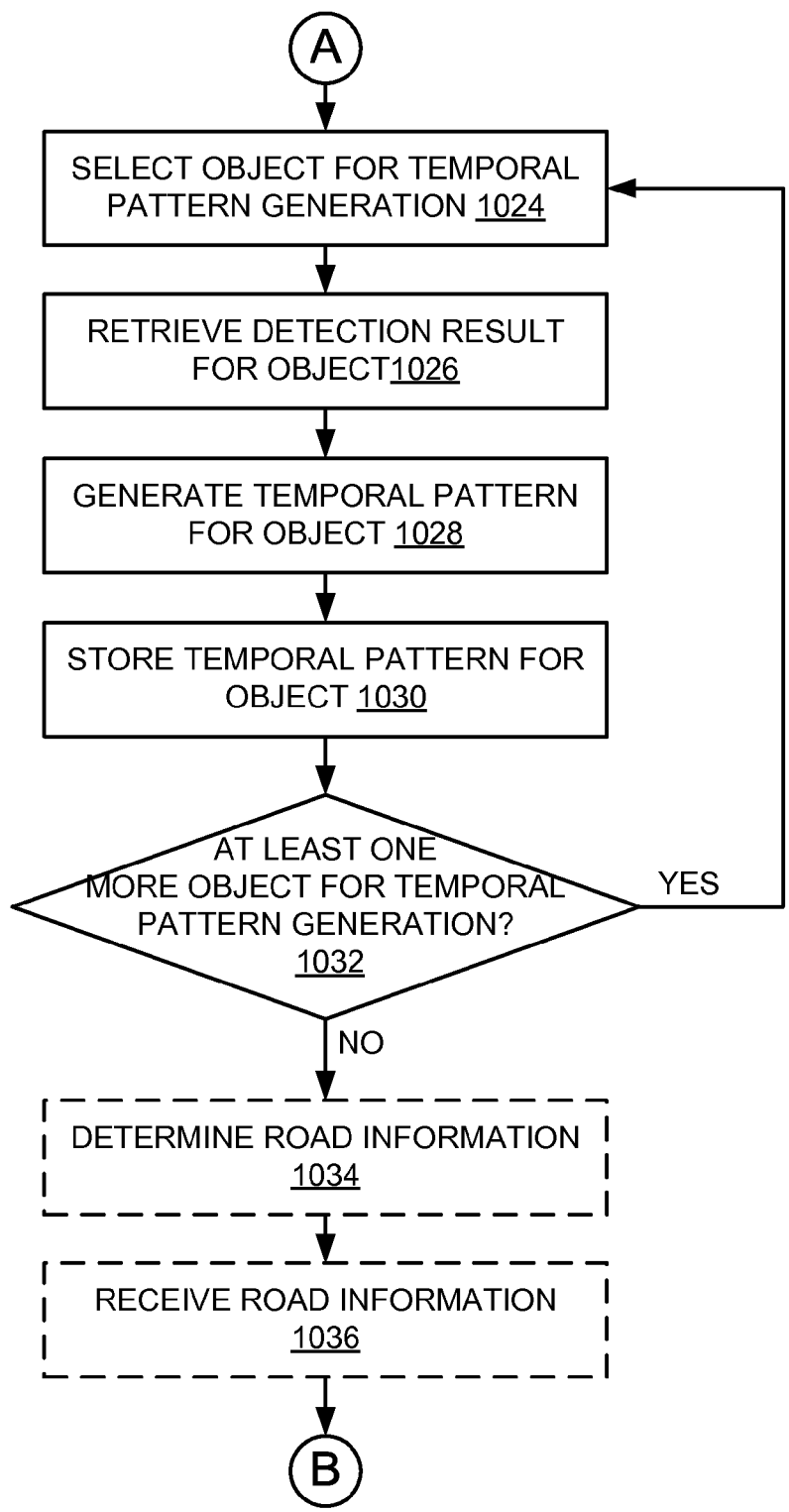
Figure 10C:
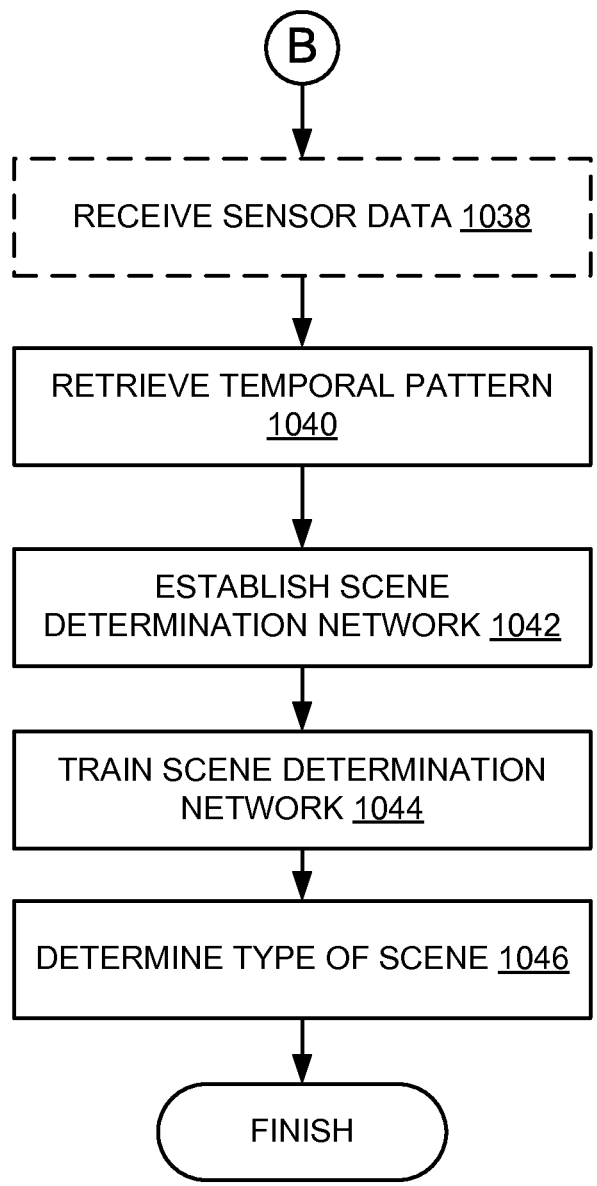

FIGS. 10A-10C are flow diagrams illustrating a method 1000 for scene determination according to one embodiment. Turning now to FIG. 10A, the communication interface 202 receives 1002 a video including one or more frames from the camera 110. The communication interface 202 sends the one or more frames to the downsampling module 232. The downsampling module 232 downsamples 1004 the one or more frames. The one or more frames after downsampling are sent to the object detector 234.

The object detector 234 determines 1006 one or more objects to detect in the one or more frames. For example, the object detector 234 determines to detect presence of trees, walls, and houses, etc., in the one or more frames. The object detector 234 selects 1008 an object that is not detected yet from the one or more objects. Optionally, the object detector 234 selects 1010 a margin to detect the selected object. For example, the object detector 234 selects a left margin or a right margin to detect the object in the one or more frames. The object detector 234 selects 1012 a frame from the one or more frame for the object detection. For example, the object detector 234 selects a frame that is not detected for presence of the object yet from the one or more frames.

The object detector 234 detects 1014 presence of the object in the selected frame to generate a detection result associated with the object for the selected frame. For example, the object detector 234 performs steps similar to the steps 708-718 described above with reference to FIG. 7 to detect presence of the object in the selected frame. The object detector 234 stores 1016 the detection result in the storage 116.

The object detector 234 determines 1018 whether there is at least one more frame in the one or more frames to be detected for presence of the object. If there is at least one more frame to be detected, the method 1000 moves to step 1012. Otherwise, the method 1000 moves to step 1020. At step 1020, the object detector 234 determines whether there is at least one more margin to detect presence of the object. If there is at least one more margin to detect the object, the method 1000 moves to step 1010. Otherwise, the method 1000 moves to step 1022. Step 1020 is depicted using a dashed line to indicate that it is optional to the method 1000. Turning to step 1022, the object detector 234 determines whether there is at least one more object to detect. If there is at least one more object to detect, the method 1000 moves to step 1008. Otherwise, the method 1000 moves to step 1024.

Referring to FIG. 10B, the temporal pattern module 236 selects 1024 an object from the one or more objects to generate a temporal pattern. For example, the temporal pattern module 236 selects an object for which a temporal pattern is not generated yet from the one or more objects. The temporal pattern module 236 retrieves 1026 one or more detection results associated with the one or more frames for the object from the storage 116. The temporal pattern module 236 generates 1028 a temporal pattern for the object based at least in part on the one or more detection results. The temporal pattern module 236 stores 1030 the temporal pattern for the object in the storage 116. The temporal pattern module 236 determines 1032 whether there is at least one more object in the one or more objects for which a temporal pattern is not generated yet. If there is at least one more object for which a temporal pattern is not generated, the method 1000 moves to step 1024. Otherwise, the method 1000 moves to step 1034.

At step 1034, the road condition module 216 determines road information from the one or more frames and sends the road information to the scene determination module 208. The scene determination module 208 receives 1036 the road information from the road condition module 216. Steps 1034 and 1036 are optional features of the method 1000.

Turning to FIG. 10C, the scene determination module 208 optionally receives 1038 sensor data from the sensor module 214. The scene determination module 208 retrieves 1040 one or more temporal patterns for the one or more objects from the storage 116. The scene determination module 208 establishes 1042 a scene determination network. For example, the scene determination module 208 establishes a Bayesian network for scene determination. The scene determination module 208 trains 1044 the scene determination network. For example, the scene determination module 208 retrieves training data from the storage 116 and trains the scene determination network based at least in part on the training data. The scene determination module 208 determines 1046 a type of the scene based at least in part on one or more of the road information, the sensor data and the one or more temporal patterns for the one or more objects. For example, the scene determination module 208 applies one or more of the road information, the sensor data, a left-margin temporal pattern for tree presence and a right-margin temporal pattern for tree presence as inputs to the scene determination network and generates one or more probabilities for one or more scenes as outputs from the scene determination network. The scene determination module 208 determines the type of the scene based at least in part on the one or more probabilities.

Figure 11A:
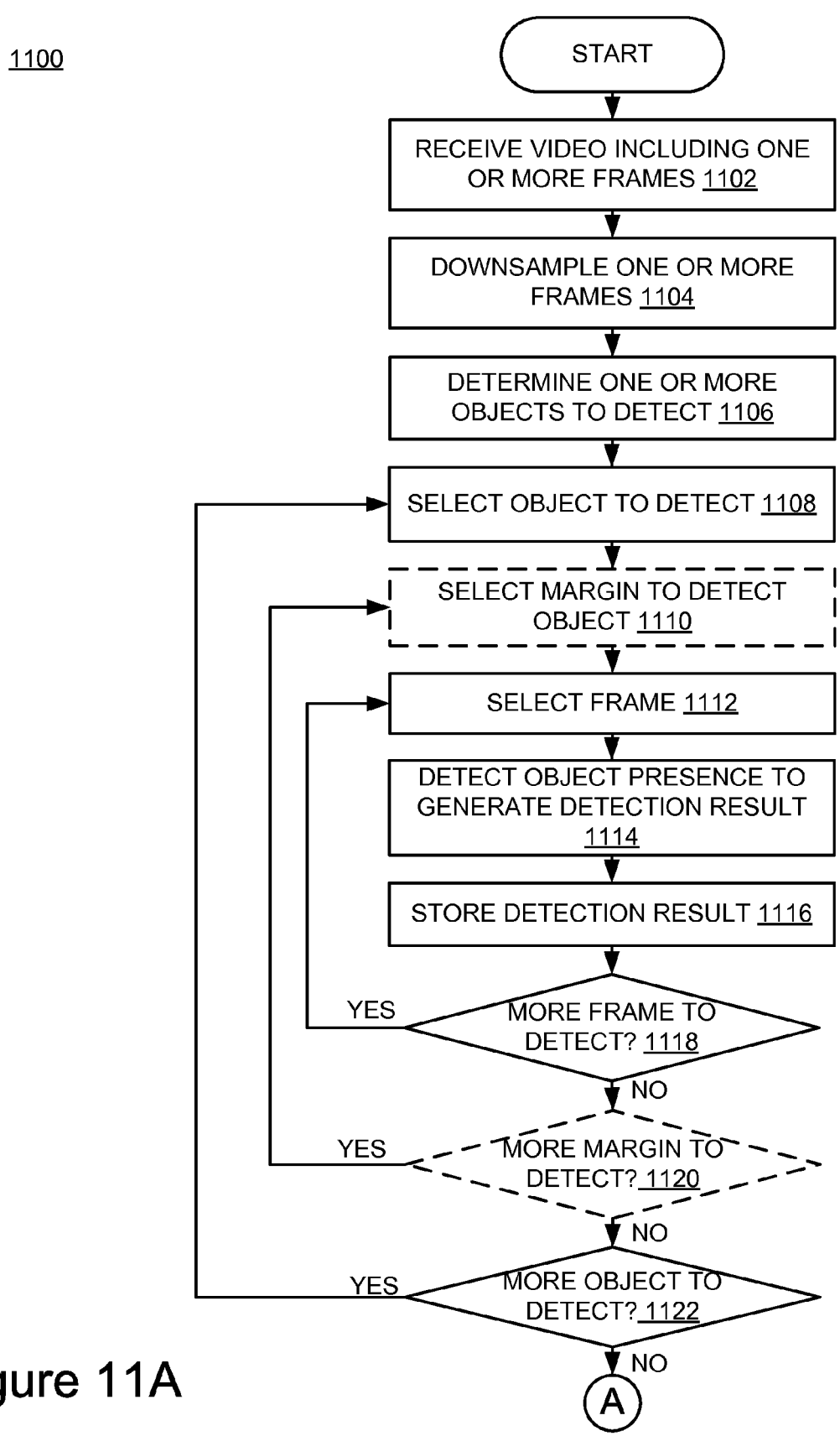
FIGS. 11A-11C are flow diagrams illustrating a method for scene prediction according to one embodiment.
Figure 11B:
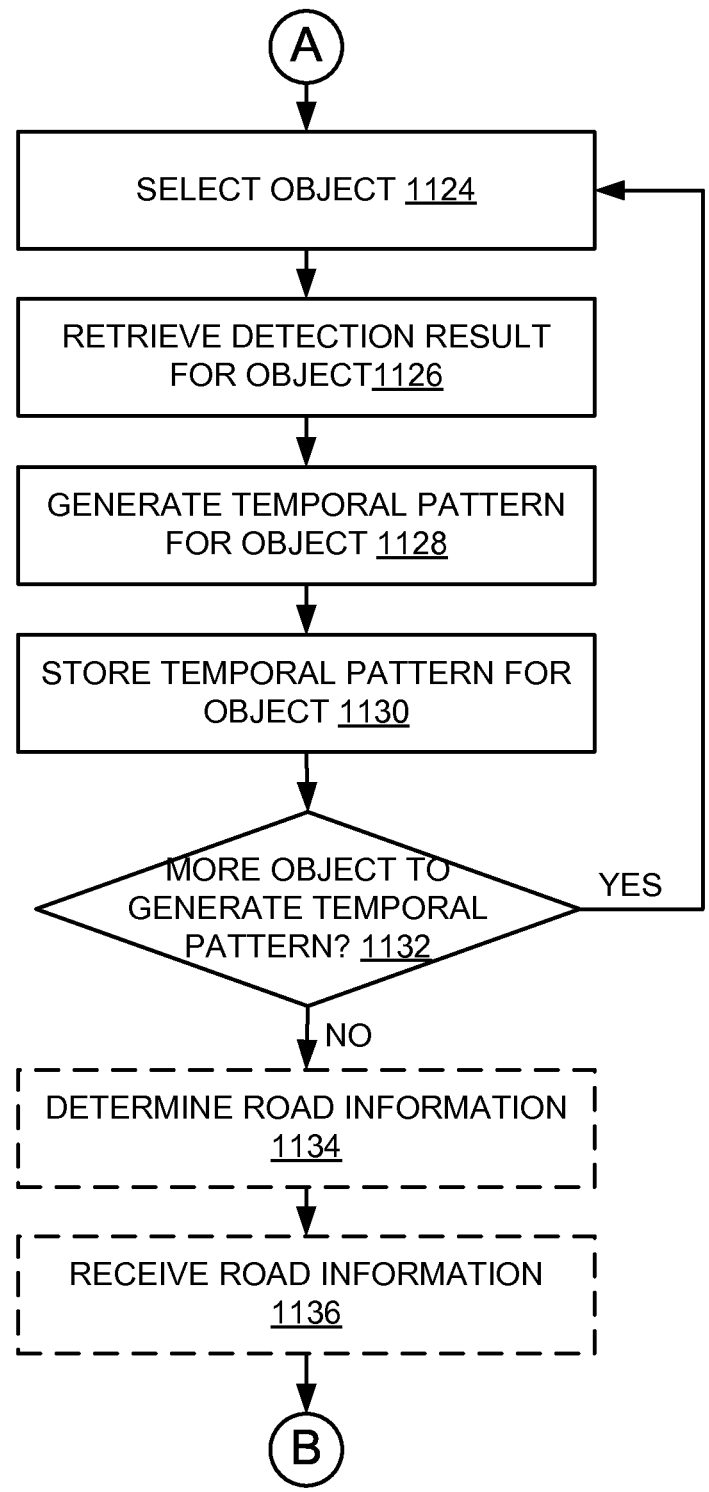
Figure 11C:
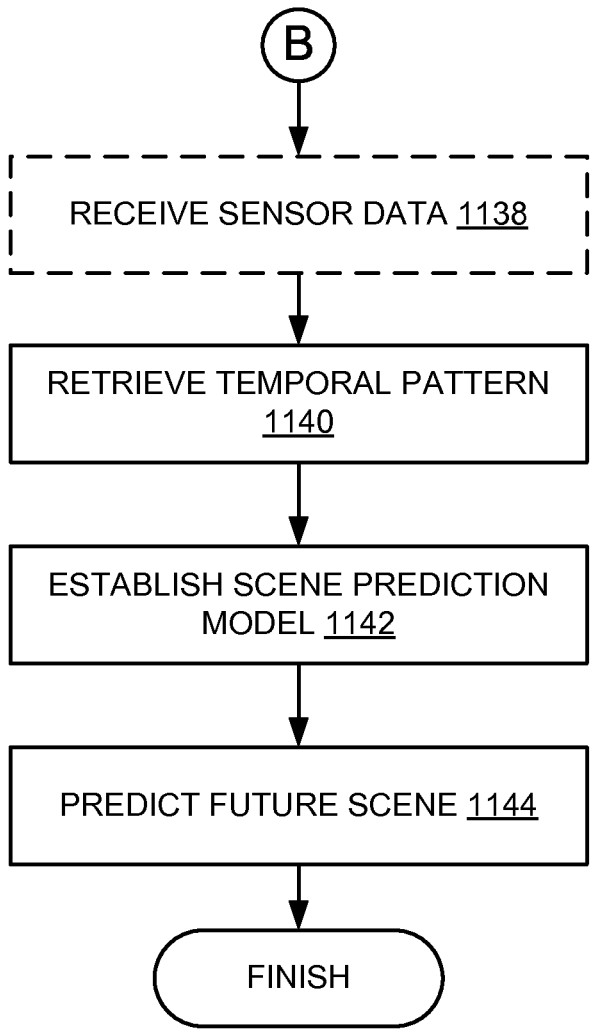

FIGS. 11A-11C are flow diagrams illustrating a method 1100 for scene prediction according to one embodiment. Descriptions for steps 1102-1132 are similar to the descriptions for steps 1002-1032 described above for FIGS. 10A and 10B, and therefore these descriptions will not be repeated here. Turning to step 1134 in FIG. 11B, the road condition module 216 determines road information from the one or more frames and sends the road information to the scene prediction module 210. The scene prediction module 210 receives 1136 the road information from the road condition module 216.

Referring now to FIG. 11C, the scene prediction module 210 optionally receives 1138 sensor data from the sensor module 214. The scene prediction module 210 retrieves 1140 one or more temporal patterns for the one or more objects from the storage 116. The scene prediction module 210 establishes 1142 a scene prediction model. For example, the scene prediction module 210 establishes a Hidden Markov model to predict a future scene. The scene prediction module 210 predicts 1144 a future scene based at least in part on the scene prediction model. For example, the scene prediction module 210 establishes a scene prediction model for a forest scene, applies one or more of the road information, the sensor data and one or more temporal patterns for tree presence as inputs to the scene prediction model and generates one or more future states of the forest scene as outputs from the scene prediction model. The scene prediction module 210 predicts a future scene to be a forest scene if a future state corresponding to the future scene is "true."

Figure 12A:
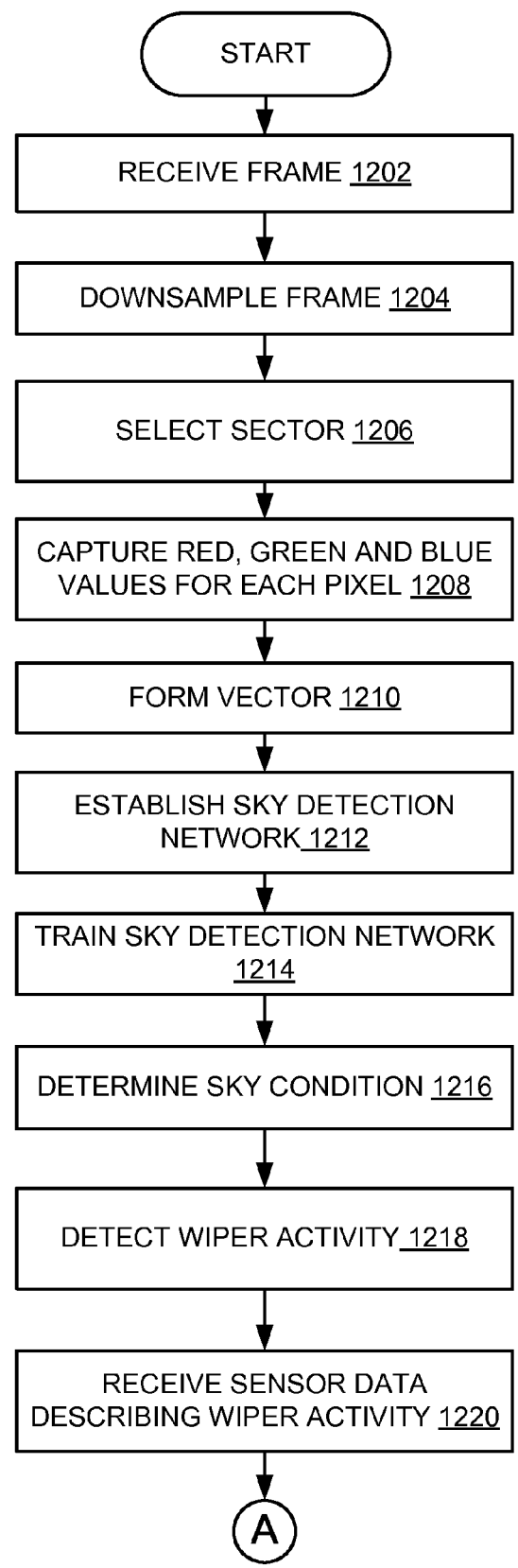
FIGS. 12A and 12B are flow diagrams illustrating a method for weather determination according to one embodiment.
Figure 12B:
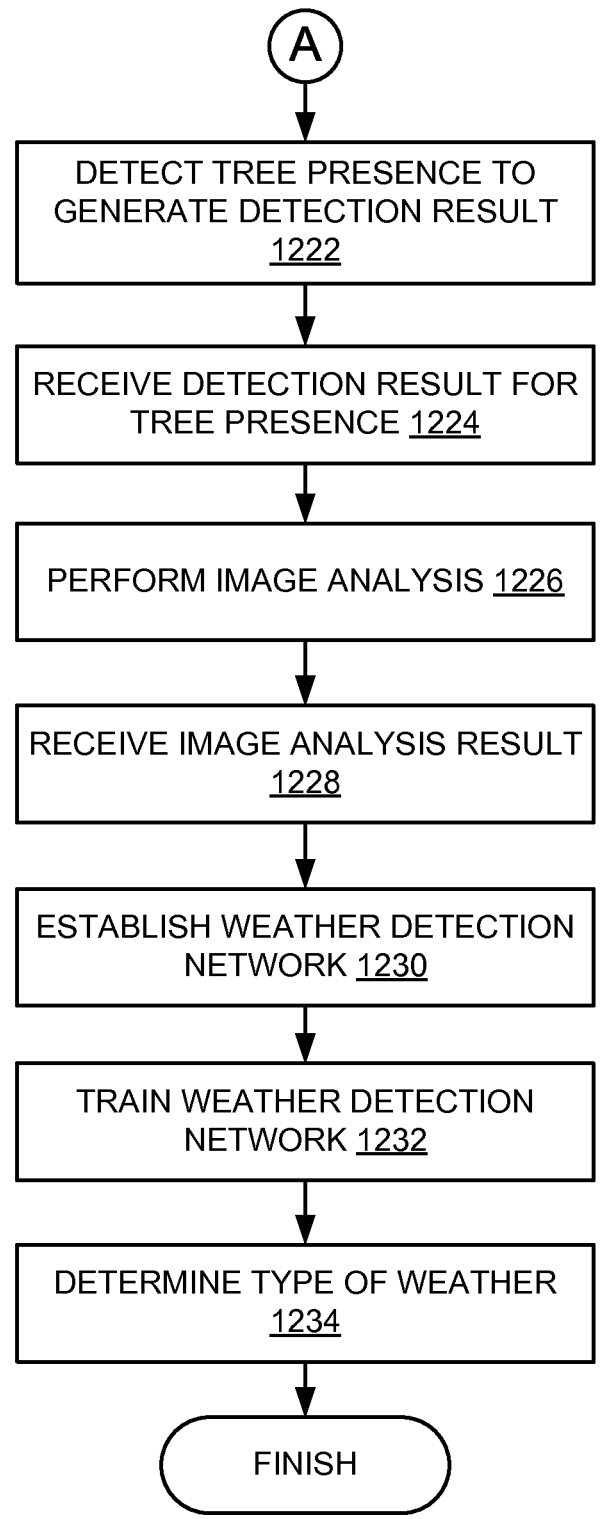

FIGS. 12A and 12B are flow diagrams illustrating a method 1200 for weather determination according to one embodiment. Referring to FIG. 12A, the communication interface 202 receives 1202 a frame from the camera 110 and sends the frame to the downsampling module 232. In one embodiment, the communication interface 202 receives a video including one or more frames from the camera 110 and steps 1204-1234 of the method 1200 described below are performed to each of the one or more frames. The downsampling module 232 downsamples 1204 the frame and sends the frame after downsampling to the sky condition detector 238.

The sky condition detector 238 selects 1206 a sector in the frame to detect a sky condition. The sky condition detector 238 captures 1208 values for the red color, green color and blue color (RGB values) for each pixel in the sector and forms 1210 a vector including the RGB values for each pixel in the sector. The sky condition detector 238 establishes 1212 a sky detection network. For example, the sky condition detector 238 establishes a feed-forward neural network to determine the sky condition. The sky condition detector 238 trains 1214 the sky detection network. For example, the sky condition detector 238 retrieves training data from the storage 116 and trains the sky detection network based at least in part on the training data. The sky condition detector 238 determines 1216 a sky condition based at least in part on the sky detection network. For example, the sky condition detector 238 applies the vector including the RGB values as inputs to the sky detection network and generates one or more sky detection results as outputs from the sky detection network. The sky condition detector 238 determines the sky condition based at least in part on the one or more sky detection results. For example, if a sky detection result for sunny sky is "true," the sky condition detection 238 determines that the sky condition is sunny sky.

The sensor module 214 detects 1218 any activity of a wiper in an automobile. For example, the sensor module 214 detects whether the wiper is activated. If the wiper is activated, the sensor module 214 receives a signal from a sensor 112 monitoring the wiper. The sensor module 214 generates sensor data describing the activity of the wiper based at least in part on the signal. The weather determination engine 212 receives 1220 the sensor data describing the activity of the wiper from the sensor module 214.

Referring now to FIG. 12B, the object detector 234 detects 1222 presence of trees in the frame to generate a detection result. For example, the object detector 234 performs steps similar to the steps 708-718 described above in FIG. 7 to detect presence of trees in the frame. The weather determination engine 212 receives 1224 the detection result for tree presence from the object detector 234. In one embodiment, the image analysis module 240 performs 1226 an image analysis for the frame and generates an image analysis result such as a mean brightness for tress detected in the frame. The image analysis module 240 sends the image analysis result to the weather determination engine 212.

The weather determination engine 212 receives 1228 the image analysis result from the image analysis module 240. The weather determination engine 212 establishes 1230 a weather detection network for determining the weather. In one embodiment, the weather detection network is a Bayesian network. The weather determination engine 212 trains 1232 the weather detection network and determines 1234 a type of weather for the frame using the weather detection network. For example, the weather determination engine 212 applies the one or more sky detection results, the sensor data describing the activity of the wiper and the image analysis result as inputs to the weather detection network and generates one or more probabilities for different types of weather as outputs from the weather detection network. The weather determination engine 212 determines the type of weather based at least in part on the one or more probabilities.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for scene determination comprising:
   receiving a video including at least one frame, the at least one frame including information describing a scene;
   detecting a presence of an object in the at least one frame and generating at least one detection result based at least in part on the detection;
   generating a temporal pattern associated with the object based at least in part on the at least one detection result; and
   determining a type of the scene based at least in part on the temporal pattern.

2. The method of claim 1, wherein the scene includes one or more of a forest scene, a suburban scene, a freeway scene and an urban scene.

3. The method of claim 1, wherein detecting the presence of the object in the at least one frame and generating the at least one detection result comprises:
   generating a vector including a first value for a detected red color, a second value for a detected green color and a third value for a detected blue color for one or more pixels included in the at least one frame;
   establishing an object detection network;
   applying the vector as an input to the object detection network; and
   generating the at least one detection result as an output of the object detection network.

4. The method of claim 1, wherein determining the type of the scene based at least in part on the temporal pattern further comprises:
   establishing a scene determination network;
   applying the temporal pattern as an input to the scene determination network;
   generating one or more probabilities as an output from the scene determination network; and
   determining the type of the scene based at least in part on the one or more probabilities.

5. The method of claim 1, wherein determining the type of the scene further comprises:
- receiving road information and sensor data; and
- determining the type of the scene based at least in part on the temporal pattern, the road information and the sensor data.

6. The method of claim 1 further comprising:
- establishing a scene prediction model for predicting a future scene;
- applying the temporal pattern as an input to the scene prediction model; and
- predicting the future scene based at least in part on an output from the scene prediction model.

7. The method of claim 1 further comprising:
- determining a sky condition in the at least one frame by generating one or more sky detection results; and
- determining a type of weather for the scene based at least in part on the one or more sky detection results.

8. A system for scene determination comprising:
- one or more processors;
- a communication interface for receiving a video including at least one frame, the at least one frame including information describing a scene;
- an object detector communicatively coupled to the communication interface, the object detector executable by the one or more processors to detect a presence of an object in the at least one frame and to generate at least one detection result based at least in part on the detection;
- a temporal pattern module communicatively coupled to the communication interface and the object detector, the temporal pattern module executable by the one or more processors to generate a temporal pattern associated with the object based at least in part on the at least one detection result; and
- a scene determination module communicatively coupled to the communication interface, the object detector and the temporal pattern module, the scene determination module executable by the one or more processors to determine a type of the scene based at least in part on the temporal pattern.

9. The system of claim 8, wherein the scene includes one or more of a forest scene, a suburban scene, a freeway scene and an urban scene.

10. The system of claim 8, wherein the object detector is further executable by the one or more processors to:
- generate a vector including a first value for a detected red color, a second value for a detected green color and a third value for a detected blue color for one or more pixels included in the at least one frame;
- establish an object detection network;
- apply the vector as an input to the object detection network; and
- generate the at least one detection result as an output of the object detection network.

11. The system of claim 8, wherein the scene determination module is further executable by the one or more processors to:
- establish a scene determination network;
- apply the temporal pattern as an input to the scene determination network;
- generate one or more probabilities as an output from the scene determination network; and
- determine the type of the scene based at least in part on the one or more probabilities.

12. The system of claim 8, wherein the scene determination module is further executable by the or more processors to:
- receive road information and sensor data; and
- determine the type of the scene based at least in part on the temporal pattern, the road information and the sensor data.

13. The system of claim 8 further comprising:
- a scene prediction module communicatively coupled to the communication interface, the object detector and the temporal pattern module, the scene prediction module executable by the one or more processors to establish a scene prediction model for predicting a future scene, to apply the temporal pattern as an input to the scene prediction model and to predict the future scene based at least in part on an output from the scene prediction model.

14. The system of claim 8 further comprising:
- a sky condition detector communicatively coupled to the communication interface, the object detector and the temporal pattern module, the sky condition detector executable by the one or more processors to determine a sky condition in the at least one frame by generating one or more sky detection results; and
- a weather determination engine communicatively coupled to the communication interface, the object detector, the temporal pattern module and the sky condition detector, the weather determination engine executable by the one or more processors to determine a type of weather for the scene based at least in part on the one or more sky detection results.

15. A computer program product comprising a non-transitory computer readable medium encoding instructions that, in response to execution by a computing device, cause the computing device to perform operations comprising:
- receiving a video including at least one frame, the at least one frame including information describing a scene;
- detecting a presence of an object in the at least one frame and generating at least one detection result based at least in part on the detection;
- generating a temporal pattern associated with the object based at least in part on the at least one detection result; and
- determining a type of the scene based at least in part on the temporal pattern.

16. The computer program product of claim 15, wherein detecting the presence of the object in the at least one frame and generating the at least one detection result further comprises:
- generating a vector including a first value for a detected red color, a second value for a detected green color and a third value for a detected blue color for one or more pixels included in the at least one frame;
- establishing an object detection network;
- applying the vector as an input to the object detection network; and
- generating the at least one detection result as an output of the object detection network.

17. The computer program product of claim 15, wherein determining the type of the scene based at least in part on the temporal pattern further comprises:
- establishing a scene determination network;
- applying the temporal pattern as an input to the scene determination network;
- generating one or more probabilities as an output from the scene determination network; and
- determining the type of the scene based at least in part on the one or more probabilities.

18. The computer program product of claim 15, wherein determining the type of the scene further comprises:
  receiving road information and sensor data; and
  determining the type of the scene based at least in part on the temporal pattern, the road information and the sensor data.

19. The computer program product of claim 15, wherein the instructions cause the computing device to perform operations further comprising:
  establishing a scene prediction model for predicting a future scene;
  applying the temporal pattern as an input to the scene prediction model; and
  predicting the future scene based at least in part on an output from the scene prediction model.

20. The computer program product of claim 15, wherein the instructions cause the computing device to perform operations further comprising:
  determining a sky condition in the at least one frame by generating one or more sky detection results; and
  determining a type of weather for the scene based at least in part on the one or more sky detection results.

* * * * *